United States Patent
Price et al.

(10) Patent No.: US 10,846,524 B2
(45) Date of Patent: Nov. 24, 2020

(54) TABLE LAYOUT DETERMINATION USING A MACHINE LEARNING SYSTEM

(71) Applicant: Adobe Inc., San Jose, CA (US)

(72) Inventors: Brian Lynn Price, Pleasant Grove, UT (US); Vlad Ion Morariu, Potomac, MD (US); Scott David Cohen, Sunnyvale, CA (US); Christopher Alan Tensmeyer, Provo, UT (US)

(73) Assignee: Adobe Inc., San Jose, CA (US)

( * ) Notice: Subject to any disclaimer, the term of this patent is extended or adjusted under 35 U.S.C. 154(b) by 188 days.

(21) Appl. No.: 16/191,158

(22) Filed: Nov. 14, 2018

(65) Prior Publication Data

US 2020/0151444 A1 May 14, 2020

(51) Int. Cl.
*G06K 9/00* (2006.01)
*G06K 9/62* (2006.01)
*G06N 7/00* (2006.01)

(52) U.S. Cl.
CPC ..... *G06K 9/00449* (2013.01); *G06K 9/00469* (2013.01); *G06K 9/6277* (2013.01); *G06N 7/005* (2013.01)

(58) Field of Classification Search
CPC ........... G06K 9/00449; G06K 9/00469; G06K 9/6277; G06N 7/005
See application file for complete search history.

(56) References Cited

U.S. PATENT DOCUMENTS

| | | | | |
|---|---|---|---|---|
| 2005/0259866 | A1* | 11/2005 | Jacobs | G06K 9/00463 382/157 |
| 2013/0218913 | A1* | 8/2013 | Bart | G06K 9/348 707/755 |
| 2020/0073878 | A1* | 3/2020 | Mukhopadhyay | G06F 16/313 |
| 2020/0125898 | A1* | 4/2020 | Zuev | G06N 3/08 |
| 2020/0151444 | A1* | 5/2020 | Price | G06N 7/005 |
| 2020/0175267 | A1* | 6/2020 | Schafer | G06K 9/00463 |

OTHER PUBLICATIONS

Clinchant, "Comparing Machine Learning Approaches for Table Recognition in Historical Register Books", 13th IAPR International Workshop on Document Analysis Systems (DAS), Apr. 2018, pp. 133-138.

(Continued)

*Primary Examiner* — Md K Talukder
(74) *Attorney, Agent, or Firm* — SBMC

(57) ABSTRACT

A table layout determination system implemented on a computing device obtains an image of a table having multiple cells. The table layout determination system includes a row prediction machine learning system that generates, for each of multiple rows of pixels in the image of the table, a probability of the row being a row separator, and a column prediction machine learning system generates, for each of multiple columns of pixels in the image of the table, a probability of the column being a column separator. An inference system uses these probabilities of the rows being row separators and the columns being column separators to identify the row separators and column separators for the table. These row separators and column separators are the layout of the table.

17 Claims, 11 Drawing Sheets

(56) References Cited

OTHER PUBLICATIONS

Everingham, "The PASCAL Visual Object Classes (VOC) Challenge", International journal of computer vision, vol. 88, No. 2, Sep. 9, 2009, 34 pages.
Gobel, "A Methodology for Evaluating Algorithms for Table Understanding in PDF Documents", In Proceedings of the 2012 ACM symposium on Document engineering, Sep. 2012, 4 pages.
Gobel, "ICDAR 2013 Table Competition", 2013 12th International Conference on Document Analysis and Recognition, Oct. 2013, pp. 1449-1453.
Grieg, "Exact Maximum a Posteriori Estimation for Binary Images", Journal of the Royal Statistical Society. Series B (Methodological), Jan. 1989, pp. 271-279.
Hu, "Why Table Ground-Truthing is Hard", Proceedings of Sixth International Conference on Document Analysis and Recognition, Sep. 2001, 5 pages.
Kingma, "Adam: A Method for Stochastic Optimization", Dec. 22, 2014, 9 pages.
Long, "Fully Convolutional Networks for Semantic Segmentation", IEEE Conference on Computer Vision and Pattern Recognition (CVPR), Nov. 14, 2014, 10 pages.
Nurminen, "Algorithm Extraction of Data Tables in PDF Documents", Apr. 16, 2013, 80 pages.
Rashid, "Table Recognition in Heterogeneous Documents using Machine Learning", Nov. 2017, 7 pages.
Rastan, "TEXUS: A Task-based Approach for Table Extraction and Understanding", in Proceedings of the 2015 ACM Symposium on Document Engineering, May 2015, 22 pages.
Schreiber, "DeepDeSRT: Deep Learning for Detection and Structure Recognition of Tables in Document Images", In Document Analysis and Recognition (ICDAR), 2017 14th IAPR International Conference on, vol. 1, Nov. 2017, pp. 1162-1167.
Shigarov, "Configurable Table Structure Recognition in Untagged PDF Documents", in Proceedings of the 2016 ACM Symposium on Document Engineering, Sep. 30, 2016, 4 pages.
Wei, "Convolutional Pose Machines", In Proceedings of the IEEE Conference on Computer Vision and Pattern Recognition, Jan. 2016, pp. 4274-4732.
Xu, "Collective Vertex Classification Using Recursive Neural Network", Jan. 24, 2017, 7 pages.
Yu, "Multi-Scale Context Aggregation by Dilated Convolutions", Computer Vision and Pattern Recognition, Apr. 2016, 13 pages.

\* cited by examiner

TABLE LAYOUT DETERMINATION USING A MACHINE LEARNING SYSTEM

BACKGROUND

As computer technology has advanced and computers have become increasingly commonplace in our lives, the viewing of information digitally rather than in paper form has increased. Different computer programs can be used to generate information as well as share and display information. This can make it difficult for computer programs to properly understand the information and display the information in a visually appealing manner because the program displaying the information is not aware of the manner in which the program that generated the information actually generated or stored the information.

One such type of information is tables. It can be useful for programs displaying tables of data to understand where the cells of the table are located so that the data can be manipulated, but it remains difficult for programs that did not create a table to understand how the table is structured and where the cells are located. This occurs for many reasons, such as differences in how cell boundaries are delineated (e.g., using lines, shading, empty space, etc.), tables having information spanning multiple cells or cells of different sizes, differences in how the tables are described, and so forth. For example, a file in the portable document format (PDF) format may include a table, but the manner in which the information describes the table can vary based on the program that generated the PDF file. E.g., the PDF file may indicate to write out all text of the table and then lines dividing cells, may indicate to alternately write out text of a cell of the table and lines defining the cell, may indicate to write out text adjacent to the table after writing out some but not all of the text of the table, and so forth. Thus, a program displaying the table in a file cannot rely on the table having been described in the file in any particular format or order, making it difficult for the program to analyze the file and determine the layout of the table.

The inability to understand and manipulate tables when displaying the tables can lead to a poor user interface, resulting in user frustration with their computers.

SUMMARY

A table layout determination system employing a machine learning system as implemented by a computing device is described to identify the layout of a table. The layout of the table refers to the locations of the cells in the table (e.g., the locations of lines, blank space, etc. that separate cells in the tables). The table layout determination system obtains an image of a table having multiple cells and determines from the image, using a row prediction machine learning system, for each of multiple rows of pixels of the image a probability that the row of pixels is a row separator that separates one of the multiple cells from another cell vertically or that is a horizontal edge of the table. The table layout determination system also determines from the image, using a column prediction machine learning system, for each of multiple columns of pixels of the image a probability that the column of pixels is a column separator that separates one of the multiple cells from another cell horizontally or that is a vertical edge of the table. The table layout determination system further identifies a layout of the table by using the determined probabilities of rows of pixels being row separators to determine one or more row separators in the table, and using the determined probabilities of columns of pixels being column separators to determine one or more column separators in the table, and maintains a record of the layout of the table.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
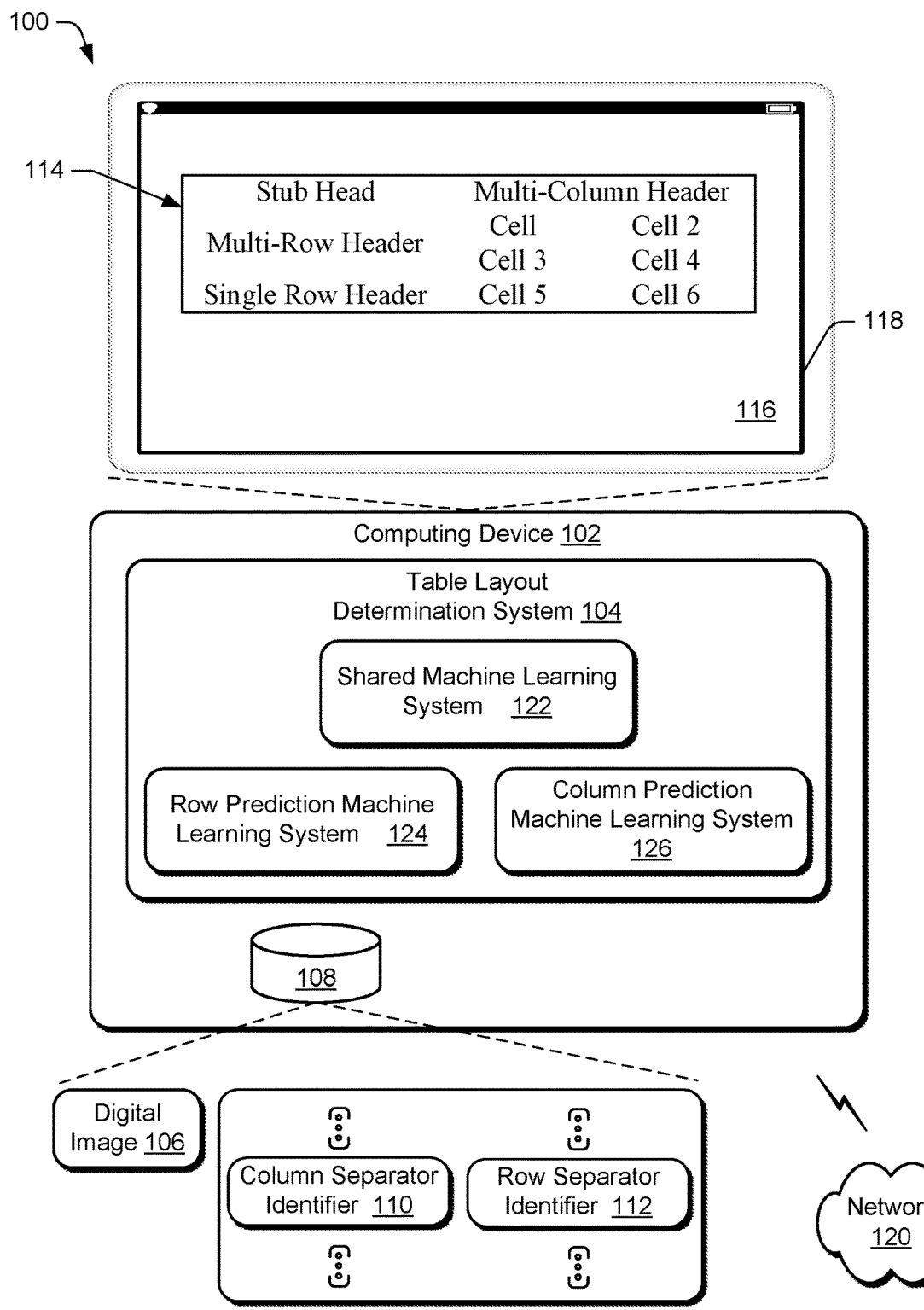
FIG. 1 is an illustration of a digital medium environment in an example implementation that is operable to employ the table layout determination using a machine learning system techniques described herein.

Table layout determination using a machine learning system is discussed herein. A table layout determination system implemented on a computing device obtains an image of a table having multiple cells. The table layout determination system uses machine learning systems to identify the layout of the table and generates an output that identifies where the multiple cells of the table are. This output can take various forms, such as identifiers of where separations between rows and columns are, identifiers of where individual cells in the table are, and so forth. The layout of the table refers to the locations of the multiple cells of the table (e.g., the locations of the lines that divide the cells of the table, coordinates of the individual cells in the table, etc.).

Knowing the layout of the table allows a computing device to modify or alter the display of the table, such as to better conform to the dimensions of a mobile device's screen. For example, the computing device displaying the table can reflow the table, sort the table by different columns or rows, display only particular rows or columns of the table, present the data in the table in a different format (e.g., as a pie chart rather than a table), and so forth. Thus, in contrast to simply displaying an image of the table, knowing the layout of the table makes these abilities to modify or alter the display of the table possible.

Generally, the table layout determination system includes a row prediction machine learning system and a column prediction machine learning system. The row prediction machine learning system generates, for each of multiple rows of pixels in the image of the table, a probability of the row being a row separator. A row separator refers to a row of pixels in the image of the table that separates one cell from another cell (e.g., vertically) or that is a horizontal edge of the table. The column prediction machine learning system generates, for each of multiple columns of pixels in the image of the table, a probability of the column being a column separator. A column separator refers to a column of pixels in the image of the table that separates one cell from another cell (e.g., horizontally) or that is a vertical edge of the table. An inference system uses these probabilities of the rows being row separators and the columns being column separators to identify the row separators and column separators for the table. These row separators and column separators are the layout of the table.

In one or more implementations, the table layout determination system implements a global cut model in which the row prediction machine learning system is trained to identify, for each row of pixels in the table, a probability that the row of pixels is a row separator. As part of determining these probabilities, the row prediction machine learning system pools (e.g., averages) values for each row of pixels in the table, generating one probability for the row of pixels that applies to all pixels in the row (rather than only a portion of a row). Similarly, the column prediction machine learning system is trained to identify, for each column of pixels in the table, a probability that the column of pixels is a column separator. As part of determining these probabilities, the column prediction machine learning system pools (e.g., averages) values for each column of pixels, generating one probability for the column of pixels that applies to all pixels in the column (rather than only a portion of a column).

An inference system receives the probabilities of each row of pixels being a row separator and the probabilities of each column of pixels being a column separator. The inference system identifies contiguous rows of likely row separators and selects one row (e.g., the midpoint of the contiguous rows) to be the row separator for those contiguous rows. For non-contiguous rows (single rows) the inference system identifies the single row as a row separator depending on its probability of being a row separator. Similarly, the inference system identifies contiguous columns of likely column separators and selects one column (e.g., the midpoint of the contiguous columns) to be the column separator for those contiguous columns. For non-contiguous columns (single columns) the inference system identifies the single column as a column separator depending on its probability of being a column separator.

Because the probabilities of rows being row separators are generated by pooling values across rows and the probabilities of columns being column separators are generated by pooling values across columns, situations can arise where a row of pixels has a high probability of being a row separator and is identified as a row separator, and/or a column of pixels has a high probability of being a column separator and is identified as a column separator, even though the row or column of pixels cuts through some text, images, or other cell content in the table. A merge machine learning system is trained to determine when to combine two cells together (e.g., because text spans multiple previously identified cells, determine the cells are to be combined so that a row separator or column separator does not cut through the text of the cell), and modifies the row separators and column separators as appropriate (e.g., moving a row separator up or down, moving a column separator left or right) so that the text, images, or other cell content in such cells is not cut by a row separator or column separator.

Additionally or alternatively, the table layout determination system can implement a recursive XY-cut model, which follows a recursive approach in analyzing the table. The entire table is the initial region analyzed by the table layout determination system, and the row prediction machine learning system is trained to identify, for each row of pixels in the region, a probability that the row of pixels is a row separator that does not cut through any cells of the table. As part of determining these probabilities, the row prediction machine learning system pools (e.g., averages) values for each row of pixels in the region, generating one probability for the row of pixels in the region that applies to all pixels in that row of the region. Similarly, the column prediction machine learning system is trained to identify, for each column of pixels in the region, a probability that the column of pixels is a column separator. As part of determining these probabilities, the column prediction machine learning system pools (e.g., averages) values for each column of pixels in the region, generating one probability for the column of pixels in the region that applies to all pixels in that column of the region.

An inference system receives the probabilities of each row of pixels in the region being a row separator and the probabilities of each column of pixels in the region being a column separator. The inference system identifies contiguous rows of likely row separators and selects one row (e.g., the midpoint of the contiguous rows) to be the row separator for those contiguous rows. For non-contiguous rows (single rows) the inference system identifies the single row as a row separator depending on its probability of being a row separator. Similarly, the inference system identifies contiguous columns of likely column separators and selects one column (e.g., the midpoint of the contiguous columns) to be the column separator for those contiguous columns. For non-contiguous columns (single columns) the inference system identifies the single column as a column separator depending on its probability of being a column separator.

The row separators and column separators define boundaries of cells, each of which may be further subdivided with one or more additional row separators and/or column separators. Each of these cells is treated as a new region, and the table layout determination system repeats this process of using the row prediction machine learning system, the column prediction machine learning system, and the inference system on each region. This process is performed recursively as new row separators and/or column separators are identified, with each cell defined in part by a new row separator or column separator being a region input to the table layout determination system.

The table layout determination system optionally outputs a prediction of which rows of cells are headers and/or which columns of cells are headers. The table layout determination system includes a header prediction machine learning system that is trained to identify, for each cell in a table, a probability that the cell is a column header or a row header. The header prediction machine learning system can optionally be included as part of the merge machine learning system.

The table layout determination system also optionally generates a value that is a prediction of the accuracy of the layout of the table determined by the table layout determination system. The table layout determination system includes a confidence machine learning system that is trained to determine a prediction of whether the confidence machine learning system determines that the layout of the table identified by the table layout determination system matches the table in the received image.

The table layout determination system also optionally generates value that are a prediction of the number of rows in the table and a prediction of the number of columns in the table. The table layout determination system includes a row and column count machine learning system that is trained to determine a prediction of the number of rows in the table and a prediction of the number of columns in the table.

Furthermore, the table layout determination system is able to use the image of the table to identify the structure of the table, including the locations of cells in the table, the size of cells in the table, and so forth. The table layout determination system need have no knowledge of, and need not make any assumptions regarding the structure of the table, such as whether cells are separated with lines, different shading, empty space, etc., the number of cells in the table, and so forth.

Furthermore, the table layout determination system is able to use the image of the table to identify the structure of the table, including the locations of cells in the table, the sizes of cells in the table, and so forth. This information identifying the structure of the table can then be used to alter how the table is displayed, such as allowing the table to be re-sorted based on values in different rows or columns, allowing particular columns or rows to be displayed where there is insufficient screen space to display columns, and so forth. The table layout determination system is able to identify this structure of the table from the image of the table itself—the table layout determination system need not rely on additional information describing the table or how the table was drawn out in order to generate the image of the table.

It should be noted that although the table layout determination system need not rely on additional information describing the table or how the table was drawn out in order to generate the image of the table, the table layout determination system can use such information if available. For example, various other images rendered from the file including the table can be used by the table layout determination system, such as a grayscale rendering of only particular types of elements (e.g., text elements, path elements, image elements, etc.), a binary rendering of character bounding boxes generated from particular types of characters (e.g., text characters, bold text characters, letter characters, punctuation characters, etc.).

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the table layout determination using a machine learning system techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including a table layout determination system 104. The table layout determination system 104 is implemented at least partially in hardware of the computing device 102 to process a digital medium 106, which is illustrated as maintained in storage 108 of the computing device 102. Such processing includes identifying a layout of a table on the digital medium 106, and outputting an indication of the table layout, such as a set of column separator identifiers 110 and a set of row separator identifiers 112. The storage 108 can be any of a variety of different types of storage, such as random access memory (RAM), Flash memory, solid state drive, magnetic disk drive, and so forth. The table layout determination system 104 can also render the table 114 in a user interface 116 for output, e.g., by a display device 118. Although illustrated as implemented locally at the computing device 102, functionality of the table layout determination system 104 may also be implemented in whole or part via functionality available via the network 120, such as part of a web service or "in the cloud."

An example of functionality incorporated by the table layout determination system 104 to identify a table layout is illustrated as a shared machine learning system 122, a row prediction machine learning system 124, and a column prediction machine learning system 126. The shared machine learning system 122 implements functionality to create local image features from the table. The row prediction machine learning system 124 implements functionality to identify, for each of multiple rows of pixels, whether the row of pixels is a row separator. A row separator refers to a row of pixels in the image of the table that separates one cell from another cell (e.g., vertically) or that is a horizontal edge of the table. The column prediction machine learning system 126 implements functionality to identify, for each of multiple columns of pixels, whether the column of pixels is a column separator. A column separator refers to a column of pixels in the image of the table that separates one cell from another cell (e.g., horizontally) or that is a vertical edge of the table.

The table layout determination system 104 can specify the table layout in any of a variety of different manners. For example, the column separator identifiers 110 and the row separator identifiers 112 can each be a list of coordinates (relative to some known origin, such as the top left corner of the table) of the starting location and the ending location of each column separator and each row separator, respectively.

By way of another example, the column separator identifiers 110 and the row separator identifiers 112 can be implemented as sets of coordinates (relative to some known origin, such as the top left corner of the table) that form cells of the table (e.g., the coordinates of the top left and bottom right corners of each of the cells, the coordinates of the bottom left and top right corners of each of the cells, etc.).

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Table Layout Determination System Architecture

Global Cut Model

Figure 2:
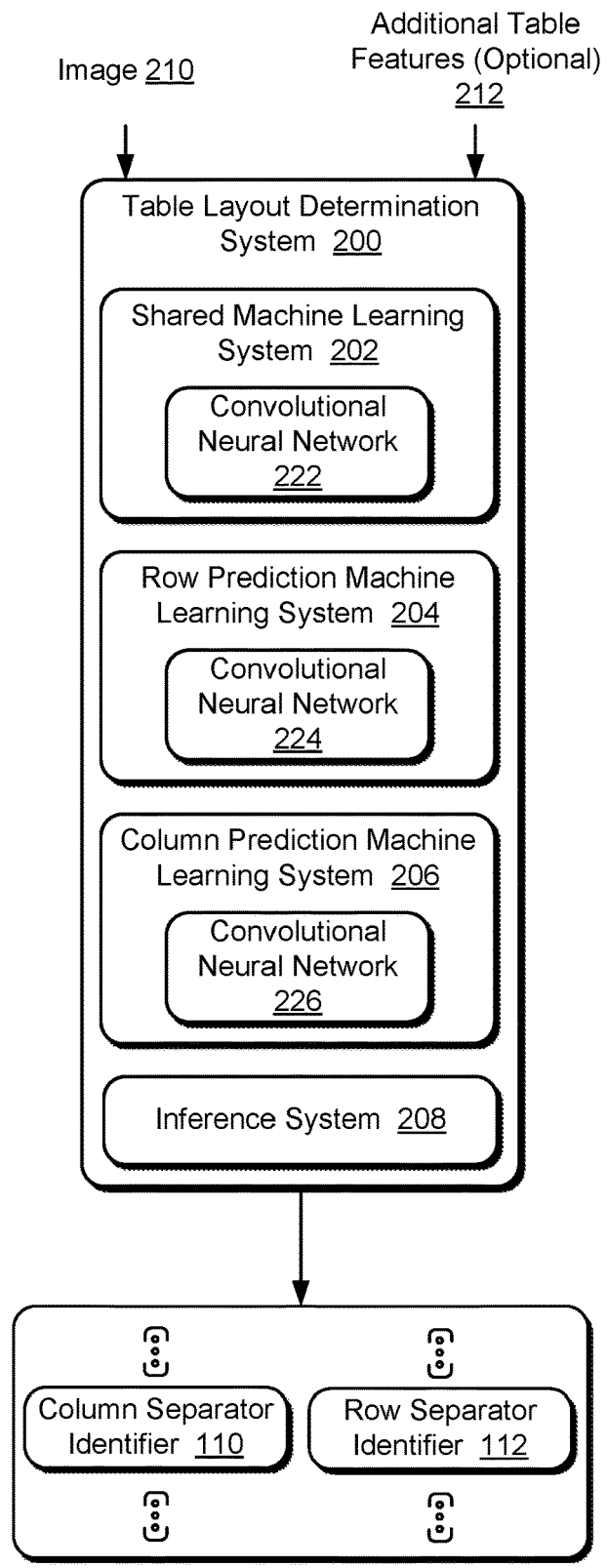
FIG. 2 is an illustration of an example architecture of a table layout determination system.

FIG. 2 is an illustration of an example architecture of a table layout determination system 200. The table layout determination system 200 includes a shared machine learning system 202, a row prediction machine learning system 204, a column prediction machine learning system 206, and an inference system 208. The table layout determination system 200 is an example implementation of the table layout determination system 104 of FIG. 1. The shared machine learning system 202 is an example implementation of the shared machine learning system 122 of FIG. 1, the row prediction machine learning system 204 is an example implementation of the row prediction machine learning system 124 of FIG. 1, and the column prediction machine learning system 206 is an example implementation of the column prediction machine learning system 126 of FIG. 1. The inference system 208 implements functionality to determine row separators using the row predictions from the row prediction machine learning system 204, and to determine column separators using the column predictions from the column prediction machine learning system 206. The table layout determination system 200 receives an image 210 that includes a table, and implements functionality to identify a layout of the table and output an indication of the table layout, such as a set of column separator identifiers 110 and a set of row separator identifiers 112.

In one or more implementations, the table layout determination system 200 implements a global cut model for identifying the layout of the table in the image 210. Using the global cut model, the table layout determination system 200 analyzes the table in the image 210 and identifies a probability of each row of pixels being a row separator and a probability of each column of pixels being a column separator. The entire image is analyzed row by row and column by column.

Figure 3:
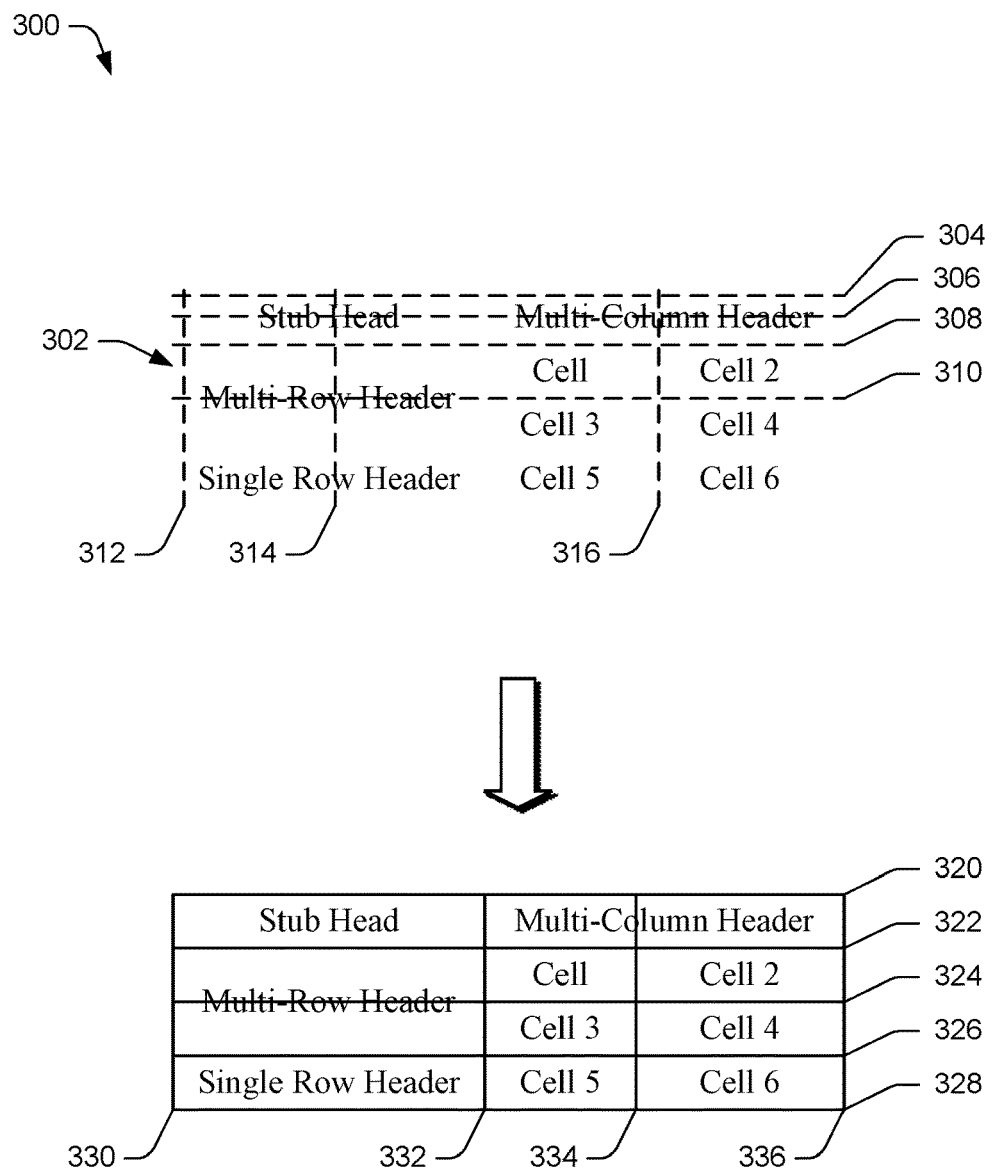
FIG. 3 illustrates an example of the operation of the table layout determination system.

FIG. 3 illustrates an example 300 of the operation of the table layout determination system 200 of FIG. 2. A table 302 is illustrated having rows and columns with various text. The table layout determination system 200 identifies a probability of each row of pixels in the table being a row separator, incorporating all pixels in the row in generating the probability. For example, a probability is generated for a row of pixels illustrated with a dashed line 304 above the words "Stub Head" and "Multi-Column Header", a probability is generated for a row of pixels illustrated with a dashed line 306 that includes the words "Stub Head" and "Multi-Column Header", a probability is generated for a row of pixels illustrated with a dashed line 308 below the words "Stub Head" and "Multi-Column Header", and a probability is generated for a row of pixels illustrated with a dashed line 310 that includes the words "Multi-Row Header".

Similarly, the table layout determination system 200 identifies a probability of each column of pixels in the table being a column separator, incorporating all pixels in the column in generating the probability. For example, a probability is generated for a column of pixels illustrated with a dashed line 312 to the left of the words "Stub", "Multi", and "Single", a probability is generated for a column of pixels illustrated with a dashed line 314 through the words "Head", "Row", and "Row", and a probability is generated for a column of pixels illustrated with a dashed line 316 through the word "Column".

The table layout determination system 200 generates identifiers of row separators, illustrated as row separators 320, 322, 324, 326, and 328. The table layout determination system 200 also generates identifiers of column separators, illustrated as column separators 330, 332, 334, and 336. The table layout determination system 200 analyzes the entire image row by row and column by column. As a result, situations can arise in which a row separator or a column separator is initially identified even though it cuts or passes through text that spans multiple previously identified cells. This situation is illustrated in FIG. 3, for example, where row separator 324 cuts through the text "Multi-Row Header" because the text "Multi-Row Header" is in a cell that spans multiple previously identified cells. By way of another example, column separator 334 cuts through the text "Multi-Column Header" because the text "Multi-Column Header" is in a cell that spans multiple previously identified cells. These situations can be resolved by a merge model that identifies situations in which cells span multiple rows or columns, and modifies the identifiers of the row separators and column separators as appropriate so that the text in such cells is not cut by a row separator or column separator, as discussed in more detail below.

Returning to FIG. 2, an image 210 including a table is obtained by the table layout determination system 200. The table layout determination system 200 is discussed with reference to using the image 210 to generate the column separator identifiers 110 and row separator identifiers 112. Additional table features 212 (e.g., information regarding text elements, information regarding path elements, information regarding bounding boxes, etc.) are optionally obtained and used by the table layout determination system 200. The use of these additional table features 212 is described in additional detail below.

The table layout determination system 200 includes the shared machine learning system 202, the row prediction machine learning system 204, and the column prediction machine learning system 206. The machine learning systems 202, 204, and 206 can each be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In the illustrated example, each of the machine learning systems 202, 204, and 206 employs a convolutional neural network, illustrated as convolutional neural networks 222, 224, and 226, respectively. A convolutional neural network is formed from layers of nodes (i.e., neurons) and can include various layers such as an input layer, an output layer, and one or more hidden layers such as convolutional layers, pooling layers, activation layers, fully connected layers, normalization layers, and so forth.

It should be noted that the convolutional neural networks 222, 224, and 226 discussed herein are example implementations of the table layout determination system 200. Different types of machine learning systems can additionally or alternatively be used, and the example structures (e.g., layer configurations) of the convolutional neural networks 222, 224, and 226 discussed herein can vary. Similarly, it should be noted that additional convolutional neural networks or machine learning systems discussed herein (e.g., with reference to FIGS. 3-10) are examples implementations of machine learning systems and/or example structures (e.g., layer configurations) of convolutional neural networks, and that additionally or alternatively different types of machine learning systems and/or convolutional neural network structures can be used.

Given the image 210 of a table and optionally other table features 212 (e.g., information rendered from the file including the image (e.g., text image, path image)), the table layout determination system 200 directly computes the divisions (separators) between rows and columns of the table, outputting these divisions as row separator identifiers and column separator identifiers. The table layout determination 200 includes two separate branches, one for rows (implemented by the row prediction machine learning system 204) and one for columns (implemented by the column prediction machine learning system 206). In each branch, information across columns or rows is pooled to aggregate information over the entirety of the table, improving the ability of the table layout determination system 200 to identify the separators between rows and columns of the table by using row and column information across the entire table rather than a limited local view of the table. The table layout determination system 200 determines the main grid layout of the table, returning all column and row boundaries (separators). Thus, the table layout determination system 200 can find column and row separators that cut through cells spanning multiple columns or rows, as discussed above with respect to FIG. 2.

The image 210 has an image height of H and an image width of W. The image height and width are discussed herein as measured in pixels, although different units of measure can alternatively be used. The image 210 is cropped so that just the table is visible. In other words, the image 210 includes all of the table elements (excluding table captions) and excludes any other elements (e.g., surrounding text). The image 210 can be cropped in various manners, such as manually by a user of the table layout determination system 200, automatically using various different rules or algorithms, and so forth.

The image 210 is optionally pre-processed prior to being analyzed by (or as part of being analyzed by), the table layout determination system 200. This pre-processing can take various forms, such as resizing the image 210 (e.g., to be in the range of 150-200 dots per inch) based on available resources (e.g., physical memory or processor performance), enforcing a maximum size on the height and/or width of the image 210 (e.g., to be less than 1200 pixels each) based on available resources (e.g., physical memory or processor performance), converting values (e.g., a feature value for each pixel) to a particular range (e.g., in the range [−0.5, 0.5], so if each pixel has a value 0-255, the values are converted to the range [−0.5, 0.5] by subtracting 127 from each value and dividing by 255), and so forth.

In one or more implementations, the image 210 is a grayscale rendered image of the table. The image can be rendered from various different file formats, such as a portable document format (PDF). The image is an H×W pixel image, and each pixel has a grayscale value that is a feature of the image. Additionally or alternatively, different image features can be used, as discussed in more detail below.

The table layout determination system 200 can include a single channel (a single set of features) for the image 210, or multiple channels in which each channel encodes a different feature for the pixels of the image 210. For example, the image 210 can alternatively be a red, green, blue (RGB) image rendering from various different file formats such as a PDF format. Each of the three red, green, and blue colors for the RGB image can be a different channel. Additionally or alternatively, the image 210 can be input as both a grayscale image and an RGB image, with the pixel values for the grayscale image being one channel and the pixel values for the RGB image being one or more additional channels.

Additionally or alternatively, various additional table features 212 can optionally be provided to and used by the table layout determination system 200. The following are examples of additional table features 212 that can be used by the table layout determination system 200. Various different additional table features 212 are discussed with reference to the PDF format, although it should be noted that the PDF format is an example file format from which these features can be obtained and various other file formats can additionally or alternatively be used, such as a PostScript format, a HyperText Markup Language (HTML) format, and so forth. Any combination of these example features can be used, and each of these features is treated by the table layout determination system 200 as a different channel.

One example additional table feature 212 is a grayscale or RGB rendering of only text elements (e.g., as indicated by the PDF format or other format), obtained by rendering only text elements from the file including image 210. Another example additional table feature 212 is a grayscale or RGB rendering of only path elements (e.g., as indicated by the PDF format or other format), obtained by rendering only path elements from the file including image 210. Another example additional table feature 212 is a grayscale or RGB rendering of only image elements (e.g., as indicated by the PDF format), obtained by rendering only image elements from the file including image 210.

Another example additional table feature 212 is a binary rendering of text character bounding boxes (e.g., as indicated by the PDF format), obtained by generating a binary rendering of only cell bounding boxes generated from text characters from the file including image 210 (e.g., where pixels displaying part of a text bounding box are rendered with one value (e.g., black) and pixels not displaying part of a text bounding box are rendered with another value (e.g., white)). Another example additional table feature 212 is a binary rendering of bold text character bounding boxes (e.g., as indicated by the PDF format or other format), obtained by generating a binary rendering of only cell bounding boxes generated from text characters with a bold font style from the file including image 210 (e.g., where pixels displaying part of a text bounding box generated from text characters with a bold font style are rendered with one value (e.g., black) and pixels not displaying part of a text bounding box generated from text characters with a bold font style are rendered with another value (e.g., white)).

Another example additional table feature 212 is a binary rendering of italicized text character bounding boxes (e.g., as indicated by the PDF format or other format), obtained by generating a binary rendering of only cell bounding boxes generated from text characters with an italics font style from the file including image 210 (e.g., where pixels displaying part of a text bounding box generated from text characters with an italics font style are rendered with one value (e.g., black) and pixels not displaying part of a text bounding box generated from text characters with an italics font style are rendered with another value (e.g., white)). Another example additional table feature 212 is a binary rendering of letter character bounding boxes (e.g., as indicated by the PDF format (or other format) and Unicode code points encoded therein), obtained by generating a binary rendering of only cell bounding boxes generated from letter characters from the file including image 210 (e.g., where pixels displaying part of a text bounding box generated from letter characters are rendered with one value (e.g., black) and pixels not displaying part of a text bounding box generated from letter characters are rendered with another value (e.g., white)). Letter characters refer to all alphabetical characters in any language (e.g., a-z and A-Z), but exclude numbers and punctuation.

Another example additional table feature 212 is a binary rendering of number character bounding boxes (e.g., as indicated by the PDF format or other format), obtained by generating a binary rendering of only cell bounding boxes generated from number characters from the file including image 210 (e.g., where pixels displaying part of a text bounding box generated from number characters are rendered with one value (e.g., black) and pixels not displaying part of a text bounding box generated from number characters are rendered with another value (e.g., white)). Another example additional table feature 212 is a binary rendering of punctuation character bounding boxes (e.g., as indicated by the PDF format or other format), obtained by generating a binary rendering of only cell bounding boxes generated from punctuation characters from the file including image 210 (e.g., where pixels displaying part of a text bounding box generated from punctuation characters are rendered with one value (e.g., black) and pixels not displaying part of a text bounding box generated from punctuation characters are rendered with another value (e.g., white)).

Another example additional table feature 212 is grayscale renderings of distances between text character bounding boxes (e.g., the bounding boxes being indicated by the PDF format or other format). These distances can be measured in different manners. For example, for each pixel that is not part of a character bounding box, the pixel value indicates the distance, traveling left (or right, or up, or down) from that pixel to the nearest bounding box (or image edge). By way of another example, for each pixel that is not part of a character bounding box, the pixel value indicates the distance between the nearest bounding box to the left and the nearest bounding box to the right (or between the nearest bounding box above and below), and if the pixel has no left/right bounding box neighbors then image edges are used to compute the distance. Distances can be mapped to grayscale values (e.g., integers 0-255) in various different manners, such as encoding each distance as a percentage of an image dimension and multiplying by 255, then truncating to integers. Another manner in which distances can be mapped to grayscale values is to divide each distance by the median text height (as computed by taking the median height of character bounding boxes) and multiplying the result by 25, then clipping values above 255 to 255.

The table layout determination system 200 receives the image 210 and optional table features 212 that are concatenated along the channel dimension to form a tensor of size, D×H×W, where D is the number of channels, H is the image height, and W is the image width. The table layout determination system 200 learns a mapping from the input image features (image 210 and optionally additional table features 212) of size D×H×W to a pair of output signals R, C, where $R \in [0,1]^H$ and $C \in [0,1]^W$. Each $r_i$, $0 \le i \le H$ is the predicted probability that the $i^{th}$ row of pixels is a row separator. And, each $c_i$, $0 \le i \le W$ is the predicted probability that the $i^{th}$ column of pixels is a column separator.

The shared machine learning system 202 implements functionality to create local image features from the image 210 and any additional table features 212. These local image features are provided to the row prediction machine learning system 204 and the column prediction machine learning system 206.

The shared machine learning system includes a convolutional neural network 222 that is a fully convolutional network. The convolutional neural network 222 receives the input features (the image 210 as well as any additional table features 212) and produces a tensor of size D×H×W. Specifically, the convolutional neural network 222 performs three convolution Rectified Linear Units (ReLU) activation operations, with a kernel size of 7×7, where the third (last) convolution uses a dilation factor of 2. The input to each convolution layer is 0-padded by 3 on each side to ensure that the output is the same size as the input. The number of output channels produced by each layer is 18. The convolutional neural network 222 uses no downsampling.

Figure 4:
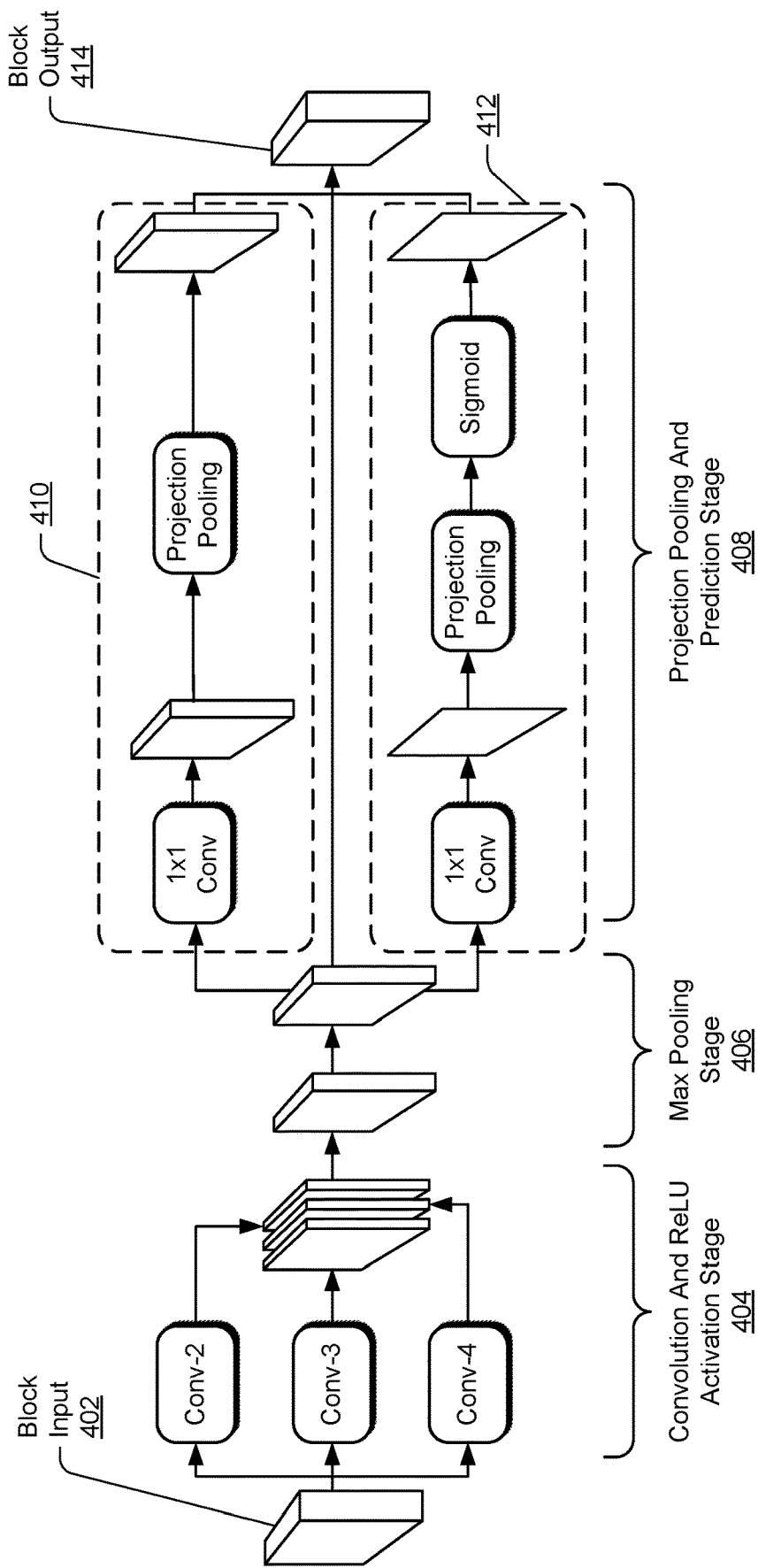
FIG. 4 illustrates an example implementation of one block of the row prediction machine learning system.

The row prediction machine learning system 204 implements functionality to identify, for each of multiple rows of pixels, whether the row of pixels is a row separator. The row prediction machine learning system 204 includes a convolutional neural network 224, which is composed of five convolutional blocks. FIG. 4 illustrates an example implementation 400 of one block of the row prediction machine learning system 204. In each of the five convolutional blocks, the convolutional receives a block input $X_0$, illustrated as block input 402. In the first block, the block input $X_0$ is the tensor of size D×H×W generated by the convolutional neural network 222.

The block input $X_0$ is provided to a convolution and ReLU activation stage 404 where convolution operations with various dilation factors are applied to $X_0$. Specifically, the convolution and ReLU activation stage 404 applies six 7×7 kernels for each of the dilation factors of 2, 3, and 4, which together produces 18 feature maps. The various dilation factors are used so that the features can be examined at multiple scales. ReLU activation is also applied element-wise. The output of the convolution and ReLU activation stage 404 is referred to as $X_1$, which is calculated as $X_1 = \text{ReLU}(\text{conv}_2(X_0) \| \text{conv}_3(X_0) \| \text{conv}_4(X_0))$, where $\|$ refers to channel-wise concatenation and $\text{conv}_N$ refers to a convolution layer with dilation factor N.

The value $X_1$ is provided to a max pooling stage 406. The row prediction machine learning system 204 generates a 1-dimensional (1D) projection across each row of pixels of the table that is a probability that the row of pixels is a row separator. Due to this goal of generating a 1D projection, rather than performing pooling with square kernels, the max pooling stage 406 applies non-overlapping pooling with 1×N kernels. Typical values for N are 1, 2, or 3, although different values can alternatively be used. Thus, the first time pooling occurs in the convolutional neural network 224, the spatial size reduces from H×W to $$H \times \frac{W}{N}.$$

The output of the max pooling stage 406 is referred to as $X_2$. In one or more implementations, only the first three blocks perform max pooling so that the width is not downsampled too much.

The output of the max pooling stage 406 is input to the projection pooling and prediction stage 408. The projection pooling and prediction stage 408 computes row features, illustrated as the top branch 410 of the projection pooling and prediction stage 408. The top branch 410 performs a 1×1 convolution followed by an in-place projection pooling operation. Essentially, the top branch 410 performs a feature transform with a 1×1 convolution (optionally followed by a ReLU activation) and then replaces every value in the resulting features with the row average. This is equivalent to performing the 1D average projection (e.g., as performed by the bottom branch 412 of the projection pooling and prediction stage 408 to produce y, as discussed in more detail below) and then upsampling to 2D (e.g., as performed by the bottom branch 412 to produce Y, as discussed in more detail below). For the 1×1 convolution, 8 output feature maps are used. The top branch 410 of the projection pooling and prediction stage 408 for horizontal projection (performed by row prediction machine learning system 204) generates $X_3$, where $$X_3(i, j, k) = \frac{1}{W} \sum_{k'}^{W} conv_1(X_2(i, j, k')),$$

where i refers to the channel, j refers to a row of pixels, and k refers to a column of pixels. The top branch 410 need not be included in the last of the five convolutional blocks. Rather, the output from the last of the five convolutional blocks is the prediction from the bottom branch 412.

The top branch 410 propagates information across the whole image. Images are potentially large (e.g., 1000×1000 pixels), and the receptive fields of the convolution layers can be relatively small (e.g., dilation by a factor of 4 on a 7×7 kernel yields a receptive field of 25×25). Note that information only propagates along a single dimension (e.g., across the width of the image for the convolutional neural network 224). Using the 1×1 convolution (instead of directly pooling on $X_2$) allows the convolutional neural network 224 to choose what information should stay local and what information should be propagated. It also reduces the number of feature maps that are concatenated (e.g., 8 vs 18 for $X_2$), which speeds up the performance of the convolution and ReLU activation stage 404.

The bottom branch 412 of the projection pooling and prediction stage 408 is implemented in the last of the five convolutional blocks, and is optionally implemented in others of the five convolutional blocks. The bottom branch 412 generates a prediction by applying a convolution layer with a 1×1 kernel (dilation 1, padding 0) to produce a single output map. This 2-dimensional (2D) output map is projected to 1D by averaging over rows. Then a sigmoid activation $$f(x) = \frac{1}{1 + e^{-x}}$$

is used to produce values in [0, 1]. This 1D signal of per-element probabilities is an output of the row prediction machine learning system 204 in the last of the five convolutional blocks, and can also be used as a feature for future blocks in others of the five convolutional blocks. The predicted 1D signal is y=f(horzproj(conv($X_2$))), where cony refers to a convolution layer, and horzproj refers to horizontally projecting (e.g., averaging) over the row. This predicted signal y is output by the last of the five convolutional blocks of the row prediction machine learning system 204 as the probabilities of the rows being row separators. The predicted signal y is a sequence of row predictions [$y_1$, $y_2$, . . . , $y_n$], where $y_i \in [0,1]^H$.

To use y as a feature for future blocks, the row vector y is repeatedly horizontally concatenated with itself to produce Y=[yy . . . y], where Y has the same spatial size as $X_2$. The purpose of concatenating Y in each block is to allow the convolutional neural network 224 to learn some structure prediction. The first prediction block produces y, which is trained to match to the ground truth signal (though with a smaller loss weight), so the convolutional neural network 224 can examine the explicit initial prediction and make refinements as appropriate. Having multiple predictions also increases the accuracy of identifying row separators.

For blocks other than the last of the five convolutional blocks, the projection pooling and prediction stage 408 generates a block output 414 which is used as the block input to the next one of the five convolutional blocks. The block output 414 is $X_2\|Y\|X_3$, where ∥ refers to channel-wise concatenation.

It should be noted that this discussion of implementation 400 of a block of convolutional neural network 224 is an example implementation and that various changes can be made to the implementation. For example, downsampling may not be used in each convolutional block, and a prediction need not be generated in each convolutional block. By way of another example, the number of convolutional blocks can vary (e.g., only 3 convolutional blocks may be used), the dilation factors used by the convolution and ReLU activation stage 404 can vary, and so forth. By way of another example, rather than averaging, other projections can be performed by the top branch 410 of the projection pooling and prediction stage 408, such as p-norms.

Returning to FIG. 2, the column prediction machine learning system 206 implements functionality to identify, for each of multiple columns of pixels, whether the column of pixels is a column separator. The column prediction machine learning system 206 includes a convolutional neural network 226 that is implemented similarly to convolutional neural network 224 of the row prediction machine learning system 204, having similar layers and performing similar operations as the convolutional neural network 224. The convolutional neural network 226 differs from the convolutional neural network 224 in that the height and width dimensions are transposed, and the weights of the filters in the convolutional neural network 226 are not shared with the filters in the convolutional neural network 224. Thus, during training of the table layout determination system 200, different weights can be set for filters of the convolutional neural network 224 than are set for the convolutional neural network 226. Thus, the example implementation 400 illustrated in FIG. 4 is also an example implementation of one block of the column prediction machine learning system 206.

Except as noted herein, the convolutional neural network 226 is implemented in the same manner as the convolutional neural network 224. The differences in the implementation of the convolutional neural network 226 and the convolutional neural network 224 are discussed in more detail as follows. The block input $X_0$ is provided to the convolution and ReLU activation stage 404 where convolution operations with various dilation factors are applied to $X_0$, as discussed above. The max pooling stage 406 applies non-overlapping pooling with N×1 kernels, with typical values for N being 1, 2, or 3, although different values can alternatively be used. Thus, the first time pooling occurs in the convolutional neural network 226, the spatial size reduces from $$H \times W \text{ to } \frac{H}{N} \times W.$$

The output of the max pooling stage 406 is referred to as $X_2$. In one or more implementations, only the first three blocks perform max pooling so that the height is not downsampled too much.

In the top branch 410 of the projection pooling and prediction stage 408, the projection pooling and prediction stage 408 performs a feature transform with a 1×1 convolution (optionally followed by a ReLU activation) and then replaces every value in the resulting features with the column average. This is equivalent to performing the 1D average projection (e.g., as performed by the bottom branch 412 of the projection pooling and prediction stage 408 to produce z, as discussed in more detail below) and then upsampling to 2D (e.g., as performed by the bottom branch 412 to produce Z, as discussed in more detail below). For the 1×1 convolution, 8 output feature maps are used. The top branch 412 of the projection pooling and prediction stage 408 for vertical projection (performed by column prediction machine learning system 206) generates $X_3$, where $$X_3(i, j, k) = \frac{1}{H} \sum_{j'}^{H} conv_1(X_2(i, j', k)),$$

where i refers to the channel, j refers to a row of pixels, and k refers to a column of pixels.

In the bottom branch 412 of the projection pooling and prediction stage 408, the 2D output map is projected to 1D by averaging over columns, and the predicted 1D signal is z=f(vertproj(conv($X_2$))), where conv refers to a convolution layer, and vetproj refers to vertically projecting (e.g., averaging) over the column. This predicted signal z is output by the last of the five convolutional blocks of the column prediction machine learning system 206 as the probabilities of the columns being column separators. The predicted signal z is a sequence of column predictions [$z_1, z_2, \ldots, z_n$], where $z_i \in [0,1]^W$.

To use z as a feature for future blocks, the column vector z is repeatedly vertically concatenated with itself to produce Z=[zz . . . z], where Z has the same spatial size as $X_2$. The purpose of concatenating Z in each block is to allow the convolutional neural network 224 to learn some structure prediction. The first prediction block produces z, which is trained to match to the ground truth signal (though with a smaller loss weight), so the convolutional neural network 224 can examine the explicit initial prediction and make refinements as appropriate. Having multiple predictions also increases the accuracy of identifying row separators.

For blocks other than the last of the five convolutional blocks, the projection pooling and prediction stage 408 generates a block output 414 which is used as the block input to the next one of the five convolutional blocks. The block output 414 is $X_2 \| Z \| X_3$, where $\|$ refers to channel-wise concatenation.

Inference

Returning to FIG. 2, the inference system 208 receives the sequence of row predictions [$y_1, y_2, \ldots, y_n$], also referred to as predicted probabilities, from the row prediction machine learning system 204 and the sequence of column predictions [$z_1, z_2, \ldots, z_n$], also referred to as predicted probabilities, from the column prediction machine learning system 206. Situations can arise in which the row predictions for multiple contiguous rows of pixels indicate a high probability of each row being a row separator, and the inference system 208 determines one of those multiple rows as being the row separator. Similarly, the column predictions for multiple adjacent columns of pixels can indicate a high probability of each column being a column separator, and the inference system 208 determines one of those multiple columns as being the column separator.

In one or more implementations, the inference system 208 applies a graph cut over each 1D sequence of predictions. A directed graph is constructed directly from the sequences predicted probabilities. For rows, there are H nodes in the graph, each node corresponding to a row of pixels in the image 210. Each node is only connected to its direct neighbors (a maximum 2) and to the 2 terminal nodes. The edge weights to one terminal node are equal to the corresponding predicted probabilities $y_i$ and the weights to the other terminal node are equal to $1-y_i$. The (directed) neighbor weights are set to 0.75 (although any other non-negative value can be used). Each node has an edge to and from each neighbor (so most nodes have degree 6). The output of the graph cut is a binary vector, with one value (e.g., 0) corresponding to pixels that are likely to not be row separators, and another value (e.g., 1) corresponding to pixels that are likely to be row separators. From this binary vector, contiguous likely row separators can be readily extracted, and a row separator identified. The row separator can be identified in various manners, such as by taking the midpoint of each of these contiguous likely row separators as the divider between rows.

The inference system 208 applies a similar procedure for columns. For columns, there are W nodes in the graph, each node corresponding to a column of pixels in the image 210. Each node is only connected to its direct neighbors (a maximum 2) and to the 2 terminal nodes. The edge weights to one terminal node are equal to the corresponding predicted probabilities $z_1$ and the weights to the other terminal node are equal to $1-z_1$. The (directed) neighbor weights are set to 0.75 (although other values can be used, such as 0.5). Each node has an edge to and from each neighbor (so most nodes have degree 6). The output of the graph cut is a binary vector, with one value (e.g., 0) corresponding to pixels that are likely to not be column separators, and another value (e.g., 1) corresponding to pixels that are likely to be column separators. From this binary vector, contiguous likely column separators can be readily extracted, and a column separator identified. The column separator can be identified in various manners, such as by taking the midpoint of each of these contiguous likely column separators as the divider between columns.

Although the inference system 208 is discussed using a graph cut implementation, the inference system 208 can additionally or alternatively be implemented in different manners. For example, the binary vector for rows can be generated by thresholding the predicted probabilities (e.g., if the predicted probability for a row is greater than a threshold probability, such as 0.75, then the binary vector component corresponding to that row has a value of 1, and otherwise has a value of 0). Similarly, the binary vector for columns can be generated by thresholding the predicted probabilities (e.g., if the predicted probability for a column is greater than a threshold probability, such as 0.75, then the binary vector component corresponding to that column has a value of 1, and otherwise has a value of 0).

Global Cut Model Training

Returning to FIG. 2, the convolutional neural networks 222, 224, and 226 are trained based on a set of training tables with associated known column separators and row separators. This set of training tables can be obtained in a variety of different manners, such as manually generated by a user, automatically generated by one or more computer programs, and so forth. The convolutional neural networks 222, 224, and 226 include various filters with weights that are tuned (e.g., trained) to minimize the loss between the known row and column separators and the row and column separators generated by the table layout determination system 200. Any of a variety of loss functions or algorithms can be used to train the convolutional neural networks 222, 224, and 226.

In one or more implementations, the probability of each row of pixels in a training table being a row separator and the probability of each column of pixels in a training table being a column separator are known. The known row probabilities are also referred to as the ground truth row signal, and the known column probabilities are also referred to as the ground truth column signal. Each predicted probability $y_i$ produced by the convolutional neural network 224 is compared to the ground truth row signal r, where $r \in \{0, 1\}^H$ and is a binary signal. Similarly, each predicted probability $z_i$ produced by the convolutional neural network 226 is compared to the ground truth column signal c, where $c \in \{0,1\}^W$ and is a binary signal. The loss is to take the average of the element-wise binary cross entropy loss:

$$L = \sum_i^n w_i \left( \sum_h^H (r_h \log(y_{ih}) + (1 - r_h)\log(1 - y_{ih})) + \sum_w^W (c_w \log(z_{iw}) + (1 - c_w)\log(1 - z_{iw})) \right)$$

where $w_i$ is a loss weight for the output of each predictive block. For example, $w_i=0.1$ for i<n, with the last $w_n=1$. With this example, the convolutional neural networks 222, 224, 226 focus on getting the last prediction closest to the ground truth.

In one or more implementations, one or more modifications are made to the use of the binary cross entropy loss L. For example, one modification to the use of the binary cross entropy loss L is that the resultant loss value can be clipped, so if $|r_h-y_{ih}|<0.1$, then the loss for that term is 0 instead of the binary cross entropy loss. By implementing clipping, the convolutional neural networks 222, 224, and 226 stop learning on areas that they are getting correct without saturating, which allows the convolutional neural networks 222, 224, and 226 to correct mistakes in cases they do not show up as much in the training set. Clipping can be performed on all weight updates, or alternatively only for some updates. For example, clipping may be performed only after a threshold number of weight updates (e.g., 5000) have been performed.

Another modification to the use of the binary cross entropy loss L is that the table border can be ignored. Essentially, the input image 210 is padded with gray pixels by the convolutional neural network 222 (a 0 in the input corresponds to grayscale value 128 in the original image due to preprocessing). Basically, predictions outside of the tight table bounding box are ignored in the loss. So, the resultant binary cross entropy loss applies from the start of the table bounding box to the end of the bounding box for each dimension.

Recursive XY-Cut Model

Referring again to FIG. 2, in one or more implementations the table layout determination system 200 implements a recursive X-Y cut model for identifying the layout of the table in the image 210. Using the recursive X-Y cut model, the table layout determination system 200 follows a recursive approach in analyzing the table in the image 210. In this recursive approach, the row prediction machine learning system 204 attempts to identify, for each row of pixels in a region, whether the row of pixels is a row separator that does not cut through any cells of the table (any text, images, or other cell content of the table). The column prediction machine learning system 206 attempts to identify, for each column of pixels in a region, whether the column of pixels is a column separator that does not cut through any cells of the table (any text, images, or other cell content of the table). This results in a set of one or more sub-regions, and the row prediction machine learning system 204 and the column prediction machine learning system 206 are again used to identify column and row separators within each sub-region that do not cut through any cells of the sub-region. The row prediction machine learning system 204 and the column prediction machine learning system 206 begin with one region (e.g., the entire table) and are used recursively until no additional row separators or column separators are identified within sub-regions, or another stopping criteria is met (e.g. number of sub-regions, time, memory).

Figure 5:
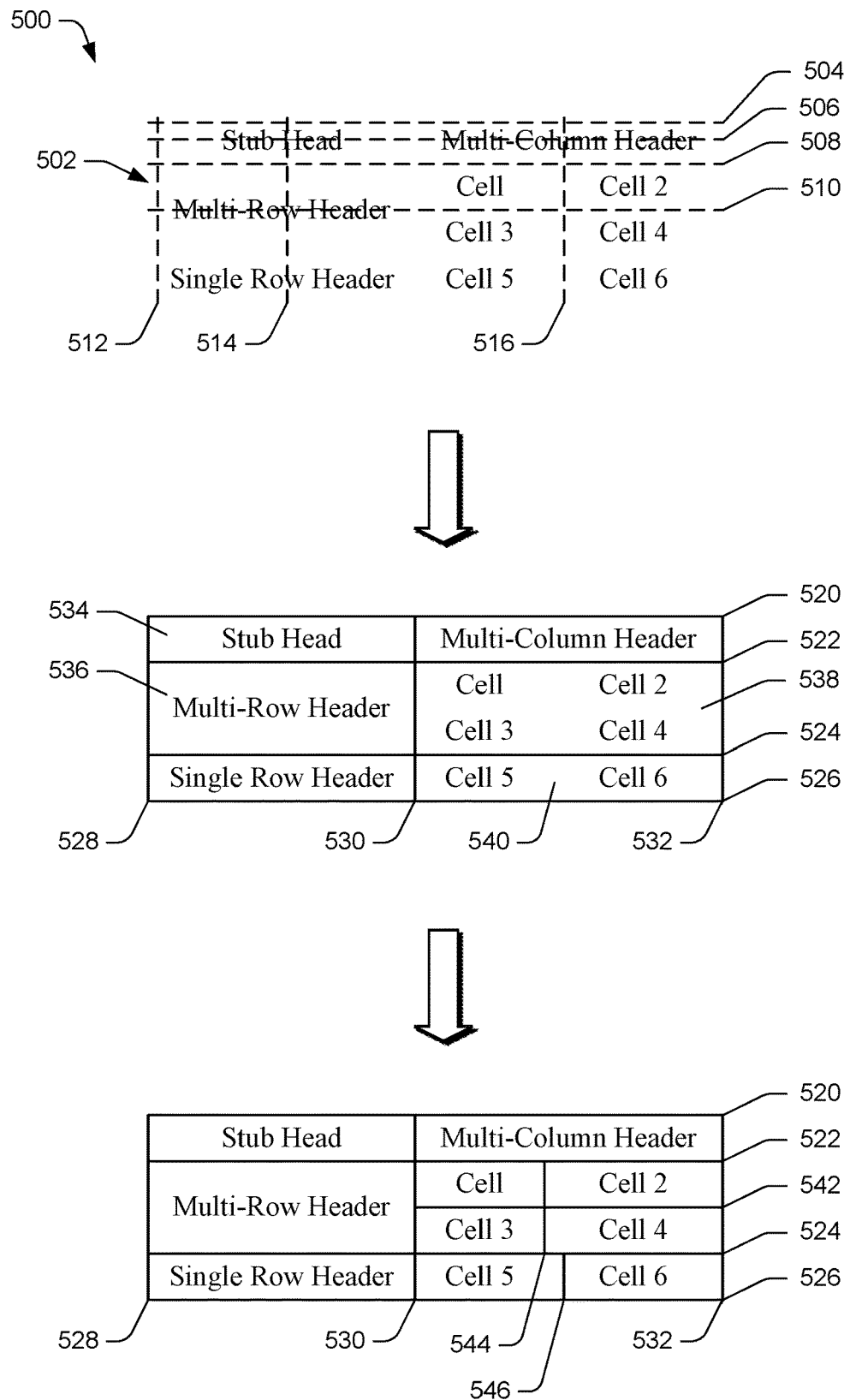
FIG. 5 illustrates an example of the operation of the table layout determination system.

FIG. 5 illustrates an example 500 of the operation of the table layout determination system 200 of FIG. 2. A table 502 is illustrated having rows and columns with various text. The table layout determination system 200 identifies a probability of each row of pixels in the table being a row separator, incorporating all pixels in the row in generating the probability. For example, a probability is generated for a row of pixels illustrated with a dashed line 504 above the words "Stub Head" and "Multi-Column Header", a probability is generated for a row of pixels illustrated with a dashed line 506 that includes the words "Stub Head" and "Multi-Column Header", a probability is generated for a row of pixels illustrated with a dashed line 508 below the words "Stub Head" and "Multi-Column Header", and a probability is generated for a row of pixels illustrated with a dashed line 510 that includes the words "Multi-Row Header".

Similarly, the table layout determination system 200 identifies a probability of each column of pixels in the table being a column separator, incorporating all pixels in the column in generating the probability. For example, a probability is generated for a column of pixels illustrated with a dashed line 512 to the left of the words "Stub", "Multi", and "Single", a probability is generated for a column of pixels illustrated with a dashed line 514 through the words "Head", "Row", and "Row", and a probability is generated for a column of pixels illustrated with a dashed line 516 through the word "Column".

The table layout determination system 200 generates identifiers of row separators, illustrated as row separators 520, 522, 524, and 526. The table layout determination system 200 also generates identifiers of column separators, illustrated as column separators 528, 530, and 532. In the first iteration, the table layout determination system 200 analyzes the entire image row by row and column by column, identifying row separators and column separators that do not cut through any cells (e.g., do not cut through any text, images, or other cell contents). As a result, situations can arise in which row separators and column separators are not identified because some text spans multiple previously identified cells. For example, a row separator exists between the cells with text "Cell" and "Cell 2", but is not identified because the text "Multi-Row Header" spans two previously identified cells. By way of another example, a column separator exits between the cells with text "Cell 5" and "Cell 6", but is not identified because the cell with the text "Multi-Column Header" spans two previously identified cells.

The table layout determination system 200 resolves this situation by iteratively identifying row separators and column separators within sub-regions. In the first iteration, the entire table is the input region and sub-regions within the table are identified. In subsequent iterations, further sub-regions within each sub-region identified in the previous iteration are identified. This process continues until analysis of each sub-region identifies no additional row separators or column separators.

As illustrated in FIG. 5, after the first iteration there are six sub-regions, shown as cells in the table. For example, cell 534 with the text "Stub Head" is a sub-region, cell 536 with the text "Multi-Row Header" is a sub-region, cell 538 with the text "Cell", "Cell 2", "Cell 3", and "Cell 4" is a sub-region, cell 540 with the text "Cell 5" and "Cell 6" is a sub-region, and so forth. After the first iteration, the table structure so far (with these six sub-regions) is used as an input to the table layout determination system 200, which identifies any row separators and column separators within each of those sub-regions. This process continues until there are no additional row separators and column separators in each sub-region. Additionally or alternatively, the process may continue for a threshold number of iterations (e.g., 3). For example, the process may continue for three iterations at most, continuing until either three iterations have been performed or there are no additional row separators and column separators in each sub-region.

As illustrated in FIG. 5, six sub-regions were identified in the first iteration. Sub-region 538 has additional row and column separators 542 and 544, and sub-region 540 has an additional column separator 546. In the second iteration, this results in four new sub-regions from region 538, one sub-region with the text "Cell", one sub-region with the text "Cell 2", one sub-region with the text "Cell 3", and one sub-region with the text "Cell 4". This also results in two new sub-regions from sub-region 540, one sub-region with the text "Cell 5", and one sub-region with the text "Cell 6". In the third iteration, no new sub-regions are identified.

The example implementation 400 in FIG. 4 as discussed above with respect to the global cut model applies to the recursive XY-cut model as well, but with a change in how pooling and upsampling is done to produce y, Y, and $X_3$ by the convolutional neural network 224 of the row prediction machine learning system 204, and a change in how pooling and upsampling is done to produce z, Z, and $X_3$ by the convolutional neural network 226 of the column prediction machine learning system 206. Furthermore, the convolutional neural networks 224 and 226 for the recursive XY-cut model may use only four convolutional blocks rather than five convolutional blocks as used by the global cut model.

The recursive XY-cut model uses an additional input image that is a binary mask showing the predicted structure so far (the row separators and column separators identified so far). Initially, this predicted structure is just one region. The predicted structure is a tree of horizontal and vertical cuts (row and column separators, respectively), which partitions the input image into non-overlapping rectangular regions. To render this structure as a binary mask, every cut is drawn as a 1-pixel wide line segment. Additionally or alternatively, to render this structure as a binary mask the outline of each sub-region bounding box can be rendered. This binary mask is optionally included as an additional table feature 212 input to the table layout determination 200.

The projection pooling and prediction stage 408 is discussed above as pooling globally across the whole image to produce a 1D signal. In the recursive XY-cut model, however, pooling is constrained to be within each region or sub-region. When there are multiple sub-regions, this operation can be viewed as cropping out just that sub-region, applying the 1D projection to the crop, and then upsampling back to the original region dimensions. After pooling and upsampling over each cropped sub-region, the cropped pooled features are stitched back together to create full-sized feature maps showing all of the column separators and row separator identified so far.

Returning to FIG. 2, the inference system 208 receives the sequence of row predictions $[y_1, y_2, \ldots, y_n]$, also referred to as predicted probabilities, from the row prediction machine learning system 204 and the sequence of column predictions $[z_1, z_2, \ldots, z_n]$, also referred to as predicted probabilities, from the column prediction machine learning system 206. The inference system 208 identifies contiguous rows of likely row separators and selects one row (e.g., the midpoint of the contiguous rows) to be the row separator for those contiguous rows. The inference system 208 operates in substantially the same manner as discussed above with reference to the global cut model, except that the inference system 208 identifies row separators and column separators in a sub-region rather than (except for possibly the initial region) across the entire table.

In one or more implementations, the input to the table layout determination system 200 for the first iteration of the recursive XY-cut model is the entire table (a single region that is the entire table). Additionally or alternatively, an initial structure can be detected. This initial structure can be used to identify sub-regions and this initial structure can be input to the first iteration of the recursive XY-cut model.

The initial structure can be detected in various manners, such as heuristically based on table lines and/or shading regions, through user input, and so forth. For example, in some image formats (e.g., the PDF format), path elements that are meant to be table lines can be identified. These path elements are typically a solid color and have extreme aspect ratios (e.g., greater than a threshold aspect ratio, such as 25:1), or are straight lines that cross the entire table. Such path elements can be distinguished from other path line elements, such as text underlines, by determining whether such lines either intersect other lines (text underlines do not), or if they span the full extent of the table image (text underlines often do not, but they could for single column tables). By way of another example, regions of table shading can be similarly detected by finding rectangles of uniform color and using all the shaded rectangles as regions.

It should be noted that if the initial structure describes a table that is fully lined and the row separators and column separators are correct, then the recursive XY-cut model will predict no update to the structure of the table (no additional row separators or column separators). If the table is partially lined, then the initially detected structure will be a subset of the desired structure and provide a starting point for the recursive XY-cut model. If the table has no path elements, then the recursive XY-cut model operates as described above with the entire table being the input to the table layout determination system 200 for the first iteration of the recursive XY-cut model.

The recursive XY-cut model is trained in substantially the same manner as the global cut model, the difference being that during training the loss at each iteration is computed, and then the filter weights are tuned based on the sum of the loss of each iteration (to minimize the sum of the loss between the known row and column separators and the row and column separators generated by the table layout determination system 200).

In one or more implementations, when training the recursive XY-cut model, the input structure (the location of the row separators and column separators) is based on the ground truth structure for the training tables (the ground truth structure being known as part of set of training tables) rather than the predicted structure from the previous iteration. This helps the convolutional neural networks 222, 224, and 226 learn from good structures in the initial stages of training in contrast to learning from predicted structures (which may not be very good in the initial stages).

It should be noted that situations can arise with the recursive XY-cut model where some row separators or column separators do not line up correctly with other row separators or column separators. An example of this is illustrated in FIG. 5, where the column separator 546 does not line up with the column separator 544. In one or more implementations, the table layout determination system 200 includes an additional alignment processing system to identify situations in which column separators and/or row separators do not line up, and to modify the column separator identifiers and/or row separator identifiers as appropriate so that the column separators and/or row separators do line up when possible. The alignment processing system can be included, for example, as part of the inference system 208, can be a separate system within the table layout determination system 200, and so forth.

The alignment processing system can be implemented in various different manners, such as by applying various rules and criteria to the locations of the column separators and row separators, by using a machine learning system, and so forth. For example, the alignment processing system can analyze column separators that terminate at the same row separator (e.g., in FIG. 5, column separator 546 and column separator 544 terminate at the same row separator 524), and one or both of those column separators is changed so that the column separators align with one another if one or both can be moved without cutting through text in the table. E.g., the column separator 546 could be moved to the left so that the top of the column separator 546 aligns with the bottom of column separator 544, and/or the column separator 544 could be moved to the right so that the top of the column separator 546 aligns with the bottom of column separator 544. For column separators that are moved, the column separator identifier for that column separator is updated to reflect the movement. Similar analysis and changes can be made to the rows of the table.

The recursive XY-cut model is described as receiving as an additional input the predicted structure so far (the row separators and column separators identified so far). Additionally or alternatively, each sub-region identified in a previous iteration can be input as the current region, and any additional sub-regions within that input region are identified. For example, as illustrated in FIG. 5, six sub-regions were identified in the first iteration. In the second iteration, the table layout determination 200 can be used six times, once for each sub-region, to identify any additional row separators or column separator in each of those six sub-regions. Sub-region 538 has additional row and column separators 542 and 544, and sub-region 540 has an additional column separator 546. In the second iteration, this results in four new sub-regions from sub-region 538, one sub-region with the text "Cell", one sub-region with the text "Cell 2", one sub-region with the text "Cell 3", and one sub-region with the text "Cell 4". This also results in two new sub-regions from sub-region 540, one sub-region with the text "Cell 5", and one sub-region with the text "Cell 6". In the third iteration, the table layout determination 200 is used six times, once for each of these new sub-regions, to identify any additional row separators or column separator in each of those six new sub-regions, and no new sub-regions are identified.

Merge Model

When using the global cut model discussed above, situations can arise in which a row separator or a column separator is initially identified even though it cuts or passes through text that spans multiple rows or multiple columns. For example, as illustrated in FIG. 3, row separator 324 cuts through the text "Multi-Row Header" because the text "Multi-Row Header" spans multiple previously identified cells. By way of another example, column separator 334 cuts through the text "Multi-Column Header" because the text "Multi-Column Header" spans multiple previously identified cells. The merge model resolves these situations by identifying situations in which cells span multiple previously identified cells, and modifying the identifiers of the row separators and column separators as appropriate (e.g., moving a row separator up or down, moving a column separator left or right) so that the text in such cells is not cut by a row separator or column separator.

Figure 6:
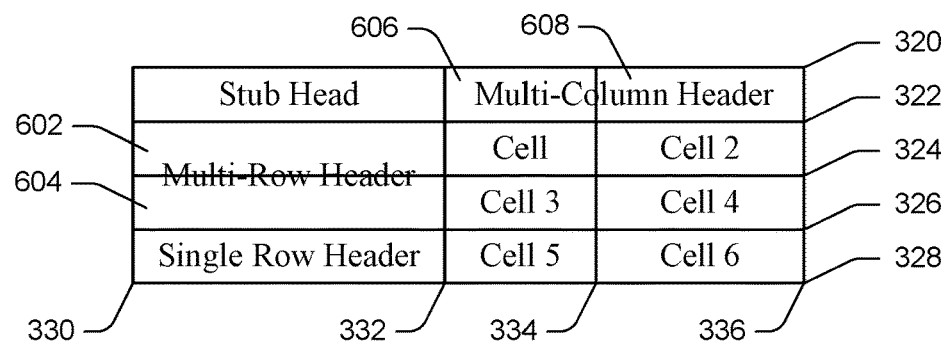
FIG. 6 illustrates an example of the operation of a merge system that implements a merge model of the table layout determination system.
Figure 6:
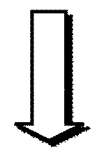
Figure 6:
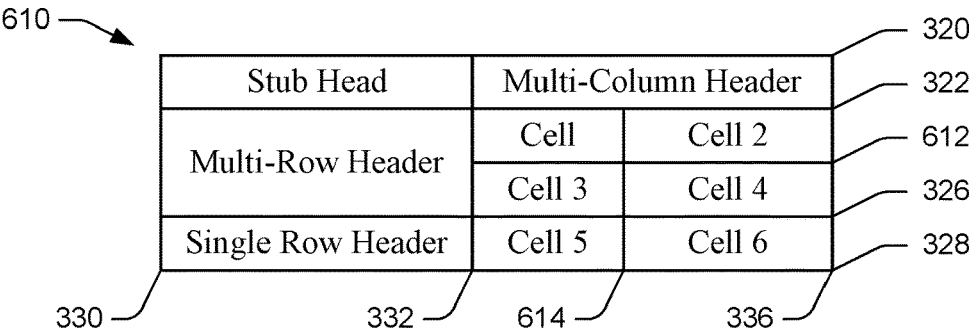

FIG. 6 illustrates an example 600 of the operation of a merge system that implements the merge model. The example 600 continues with the example 300 of FIG. 3. The table layout determination system 200 generates identifiers of row separators, illustrated as row separators 320, 322, 324, 326, and 328, as discussed above with respect to FIG. 3. The table layout determination system 200 also generates identifiers of column separators, illustrated as column separators 330, 332, 334, and 336, as discussed above with respect to FIG. 3. A merge system analyzes the cells identified by the table layout determination system 200 and determines which cells (if any) are to be merged with an adjoining cell (to the left, to the right, upwards, or downwards).

By way of example, the merge system identifies that cell 602 is to be merged with an adjoining cell downwards, and that cell 604 is to be merged with an adjoining cell upwards. By way of another example, the merge system identifies that cell 606 is to be merged with an adjoining cell to the right, and that cell 608 is to be merged with an adjoining cell to the left. This results in row separators and column separators as shown at 610. Row separators 320, 322, 326, and 328 remain the same, as do column separators 330, 332, and 336. Row separator 324, however, has been replaced with row separator 612 (or the starting/ending point of the row separator 324 has changed) so that the row separator 612 does not cut through the text "Multi-Row Header". Similarly, column separator 334 has been replaced with column separator 614 (or the starting/ending point of the column separator 334 has changed) so that the column separator 614 does not cut through the text "Column".

Figure 7:
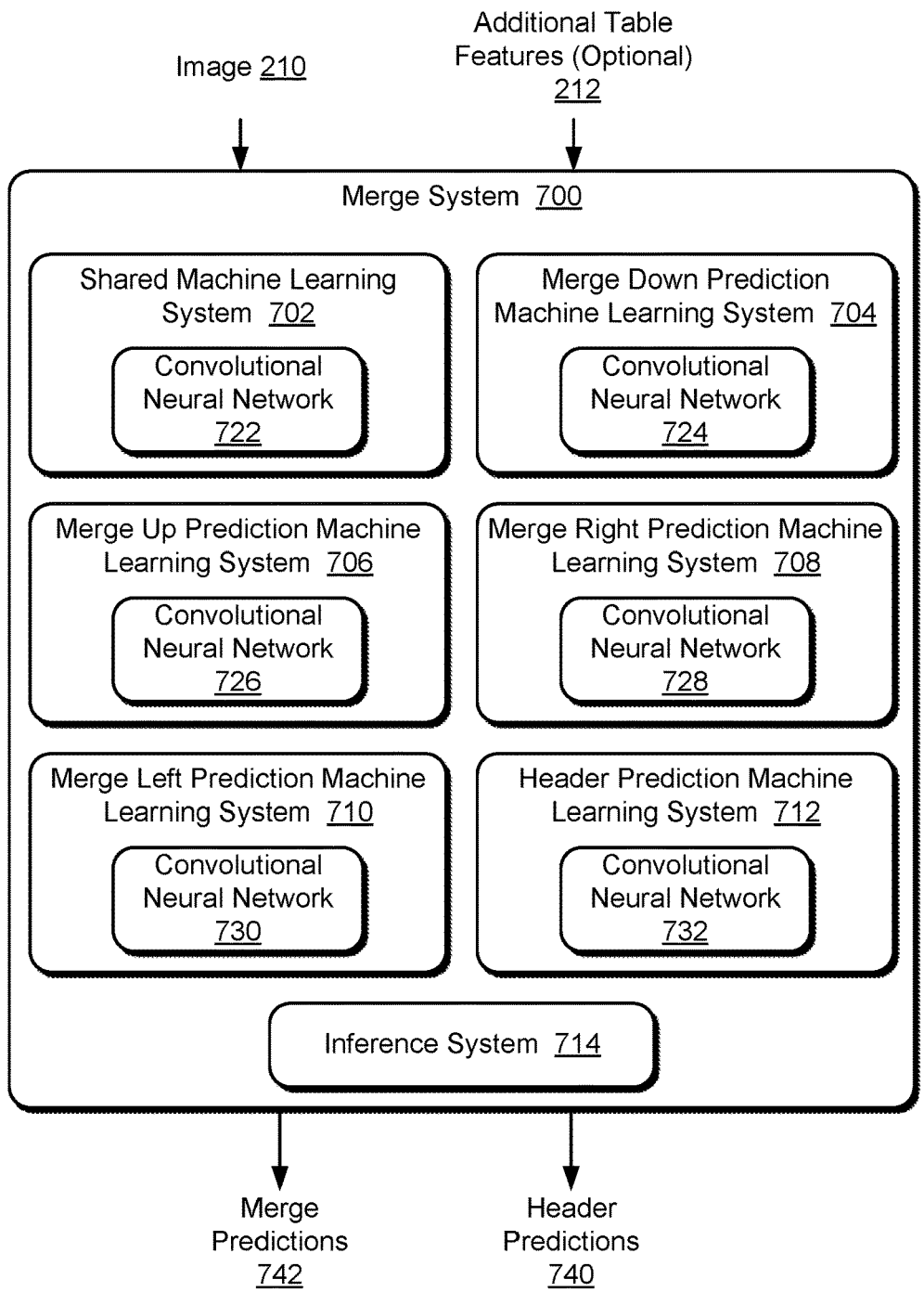
FIG. 7 illustrates an example merge system that implements a merge model of the table layout determination system.

FIG. 7 illustrates an example merge system 700 that implements a merge model. The merge system 700 includes multiple machine learning systems, which are similar to the shared machine learning system 202, the row prediction machine learning system 204, and the column prediction machine learning system 206 discussed above.

The merge system 700 can be implemented, for example, as part of the table layout determination system 104 of FIG. 1 or the table layout determination system 200 of FIG. 2. The merge system 700 includes a shared machine learning system 702, a merge down prediction machine learning system 704, a merge up prediction machine learning system 706, a merge right prediction machine learning system 708, a merge left prediction machine learning system 710, a header prediction machine learning system 712, and an inference system 714. The machine learning systems 702, 704, 706, 708, 710, and 712 are each illustrated as including a convolutional neural network 722, 724, 726, 728, 730, and 732, respectively. Although implementations using convolutional neural networks are discussed herein, the machine learning systems 702, 704, 706, 708, 710, and 712 can alternatively be implemented as other types of machine learning systems rather than convolutional neural networks.

The shared machine learning system 702 implements functionality to create local image features from the image 210 and any additional table features 212, and operates analogously to the shared machine learning system 202 discussed above. In one or more implementations the convolutional neural network 722 performs four convolution ReLU activation operations (rather than three as performed by the convolutional neural network 222), but otherwise is implemented in the same manner as the convolutional neural network 222.

The merge down prediction machine learning system 704 implements functionality to predict whether a given cell is to be merged down (and thus combined with the adjoining cell below the given cell). The convolutional neural network 724 operates similarly to the convolutional neural network 224 or 226 of the recursive XY-cut model, and except as noted herein the convolutional neural network 724 is implemented in the same manner as the convolutional neural network 224 or 226 of the recursive XY-cut model.

The convolutional neural network 724 takes as input a structure (e.g., a basic grid structure produced by the output of the inference system 208 of FIG. 2 generated from the output of the global cut model) to define the pooling regions. This input can be treated as one of the additional table features 212. The convolutional neural network 724 produces a prediction for each cell defined by the input structure, so if the global cut model produces N row separators and M column separators, then the predicted structure has (N+1)×(M+1) cells, and the convolutional neural network 724 produces an output of the same size. The output of the convolutional neural network 724 is the probability that each cell should be merged down (and thus combined with the adjoining cell below the given cell).

The convolutional neural network 724 also differs from the convolutional neural network 224 or 226 of the recursive XY-cut model in that the pooling discussed with reference to the projection pooling and prediction stage 408 is performed across an entire cell rather than a row or column of pixels. Thus, rather than having a row average or a column average, the pooling in the convolutional neural network 724 uses a cell average.

The output of the merge down prediction machine learning system 704 is a predicted signal d that is a sequence of merge down predictions $[d_1, d_2, \ldots, d_n]$, where $d_i \in [0,1]^G$, where G refers to the number of cells being analyzed by the merge system 700.

The merge up prediction machine learning system 706 implements functionality to predict whether a given cell is to be merged up (and thus combined with the adjoining cell above the given cell). The convolutional neural network 726 is implemented in the same manner as the convolutional neural network 724. The convolutional neural network 726 does differ from the convolutional neural network 724 in that the weights of the filters in the convolutional neural network 726 are not shared with the filters in the convolutional neural network 724. Thus, during training of the merge system 700, different weights can be set for filters of the convolutional neural network 726 than are set for the convolutional neural network 724. The output of the merge up prediction machine learning system 706 is a predicted signal u that is a sequence of merge up predictions $[u_1, u_2, \ldots, u_n]$, where $u_i \in [0,1]^G$, where G refers to the number of cells being analyzed by the merge system 700.

The merge right prediction machine learning system 708 implements functionality to predict whether a given cell is to be merged to the right (and thus combined with the adjoining cell to the right of the given cell). The convolutional neural network 728 is implemented in the same manner as the convolutional neural network 724. The convolutional neural network 728 does differ from the convolutional neural network 724 in that the weights of the filters in the convolutional neural network 728 are not shared with the filters in the convolutional neural network 724. Thus, during training of the merge system 700, different weights can be set for filters of the convolutional neural network 728 than are set for the convolutional neural network 724. The output of the merge right prediction machine learning system 708 is a predicted signal r that is a sequence of merge right predictions $[r_1, r_2, \ldots, r_n]$, where $r_i \in [0,1]^G$, where G refers to the number of cells being analyzed by the merge system 700.

The merge left prediction machine learning system 710 implements functionality to predict whether a given cell is to be merged to the left (and thus combined with the adjoining cell to the left of the given cell). The convolutional neural network 730 is implemented in the same manner as the convolutional neural network 724. The convolutional neural network 730 does differ from the convolutional neural network 724 in that the weights of the filters in the convolutional neural network 730 are not shared with the filters in the convolutional neural network 724. Thus, during training of the merge system 700, different weights can be set for filters of the convolutional neural network 730 than are set for the convolutional neural network 724. The output of the merge left prediction machine learning system 710 is a predicted signal l that is a sequence of merge left predictions $[l_1, l_2, \ldots, l_n]$, where $l_i \in [0,1]^G$, where G refers to the number of cells being analyzed by the merge system 700.

The header prediction machine learning system 712 implements functionality to predict whether a given cell is a header for the table. The convolutional neural network 732 is implemented in the same manner as the convolutional neural network 724. The convolutional neural network 732 does differ from the convolutional neural network 724 in that the weights of the filters in the convolutional neural network 732 are not shared with the filters in the convolutional neural network 724. Thus, during training of the merge system 700, different weights can be set for filters of the convolutional neural network 732 than are set for the convolutional neural network 724. The output of the header prediction machine learning system 712 is the header predictions 740. The header predictions 740 are a predicted signal v that is a sequence of header predictions $[v_1, v_2, \ldots, v_n]$, where $v_i \in [0,1]^G$, where G refers to the number of cells being analyzed by the merge system 700.

It should be noted that although illustrated as part of the merge system 700, the header prediction machine learning system 712 can additionally or alternatively be implemented elsewhere. For example, the header prediction machine learning system 712 can be implemented as a standalone system or as part of another system.

The inference system 714 implements functionality to determine merge predictions 742 from the merge down predictions, merge up predictions, merge right predictions, and merge left predictions. The inference system 714 examines pairs of neighboring cells and determines whether their merge decisions agree. For example, if the cell at location (y, x) has a high probability (e.g., at least a threshold probability, such as 75%) for merge up, then the inference system 714 determines that the cell at location (y, x) is to be merged up only if the cell at location (y−1, x) also has a high probability (e.g., at least a threshold probability, such as 75%) for merge down. If the cell at location (y−1, x) does not have a high probability (e.g., less than a threshold probability, such as 75%) for merge down then the cell at location (y, x) is not merged up.

The merge model is trained in substantially the same manner as the global cut model, the difference being that training is based on the predictions to merge cells rather than predictions of being row separators or column separators. Each convolutional neural network in the merge system 700 is trained on a set of training data that includes a set of images with tables and layout of the table (e.g., row separator identifiers and column separator identifiers) and indications of which cells of the table are to headers, and indications of which cells in the table are to be merged up, down, left, and right. This set of training data can be obtained in a variety of different manners, such as manually generated by a user, automatically generated by one or more computer programs, generated using the global cut model, and so forth. The convolutional neural networks 722, 724, 726, 728, 730, and 732 include various filters with weights that are tuned (e.g., trained) to minimize the loss between the known (from the training data) indications of headers, and indications of which cells in the table are to be merged up, down, left, and right and the predictions generated by the convolutional neural networks 722, 724, 726, 728, 730, and 732. Any of a variety of loss functions or algorithms can be used to train the convolutional neural networks 722, 724, 726, 728, 730, and 732. For example, the convolutional neural network 724 can be trained to minimize the element-wise binary cross entropy loss:

$$\text{Loss} = \sum_{g}^{G} (q_g \log(d_g) + (1 - q_g) \log(1 - d_g))$$

where d is the predicted signal d (the sequence of merge down predictions), q is the ground truth (the known) merge down determinations, and g is a cell being analyzed by the merge system 700. This resultant loss value can optionally be clipped, analogous to the training of the global cut model as discussed above.

Result Confidence

Figure 8:
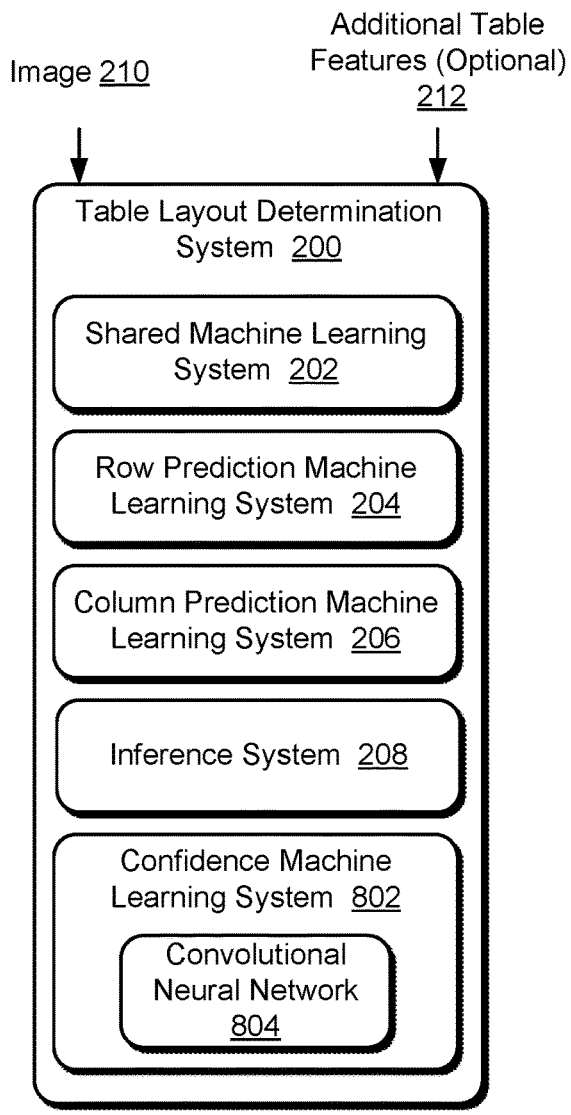
FIG. 8 illustrates another example implementation of the table layout determination system including a confidence machine learning system.

The table layout determination system 200 discussed herein optionally generates a confidence value for the identified layout of the table (e.g., the column separator identifiers and the row separator identifiers). FIG. 8 illustrates another example implementation of the table layout determination system 200, including the shared machine learning system 202, the row prediction machine learning system 204, the column prediction machine learning system 206, the inference system 208, and a confidence machine learning system 802. The confidence machine learning system 802 implements functionality to predict the confidence in the accuracy of the layout of the table determined by the table layout determination system 200. The table layout determination system 200 obtains the image 210 of the table and optionally additional table features 212, and generates row and column separator identifiers as discussed above.

The confidence machine learning system 802 employs a convolutional neural network 804. Although the confidence machine learning system 802 is discussed herein as employing a convolutional neural network, it should be noted that the convolutional neural network 804 is an example, and that different types of machine learning systems can additionally or alternatively be used.

The convolutional neural network 804 receives the image 210 (and optionally additional table features 212) and the layout of the table identified by the table layout determination system 200 (e.g., the row separator identifiers and column separator identifiers). The convolutional neural network 804 outputs a value that is a prediction of whether the convolutional neural network 804 determines that the layout of the table identified by the table layout determination system 200 matches the table in the image 210. Whether the layout of the table identified by the table layout determination system 200 matches the table in the image 210 refers to whether the row separators and column separators are in the same location in both the layout of the table identified by the table layout determination system 200 and the table in the image 210 (or the cells of the table identified by the table layout determination system 200 and the table in the image 210 are in the same location).

The convolutional neural network 804 is trained on a set of training data that includes a set of images with tables and associated structure of the table (e.g., row separator identifiers and column separator identifiers) and indications of how well the associated structure of the table matches the table in the image. This set of training data can be obtained in a variety of different manners, such as manually generated by a user, automatically generated by one or more computer programs, and so forth. The convolutional neural network 804 includes various filters with weights that are tuned (e.g., trained) to minimize the loss between the known (from the training data) indications of how well the associated structure of the tables match the tables in the images and the prediction generated by the convolutional neural network 804. Any of a variety of loss functions or algorithms can be used to train the convolutional neural network 804.

The value generated by the confidence machine learning system 802 is an indication of whether the table layout identified by the table layout determination system 200 is accurate. This confidence value can be used in a variety of different manners, and optionally maintained along with the column separator identifiers and row separator identifiers for the table. For example, if the confidence value is high (e.g., greater than a threshold value, such as 0.9), then the table layout identified by the table layout determination system 200 can be used as the layout of the table in the image 210. The display of the table can be modified or altered in various manners given the layout of the table, as discussed above. However, if the confidence value is not high (e.g., less than a threshold value, such as 0.9), then the table layout identified by the table layout determination system 200 is not used as the layout of the table in the image 210. Although this prevents the table layout identified by the table layout determination system 200 from being used to modify or alter the display of the table, it also prevents the table layout identified by the table layout determination system 200 from being used to poorly modify or alter the display of the table (and perhaps making the display of the table worse than simply displaying the image 210).

Row and Column Count Prediction

Figure 9:
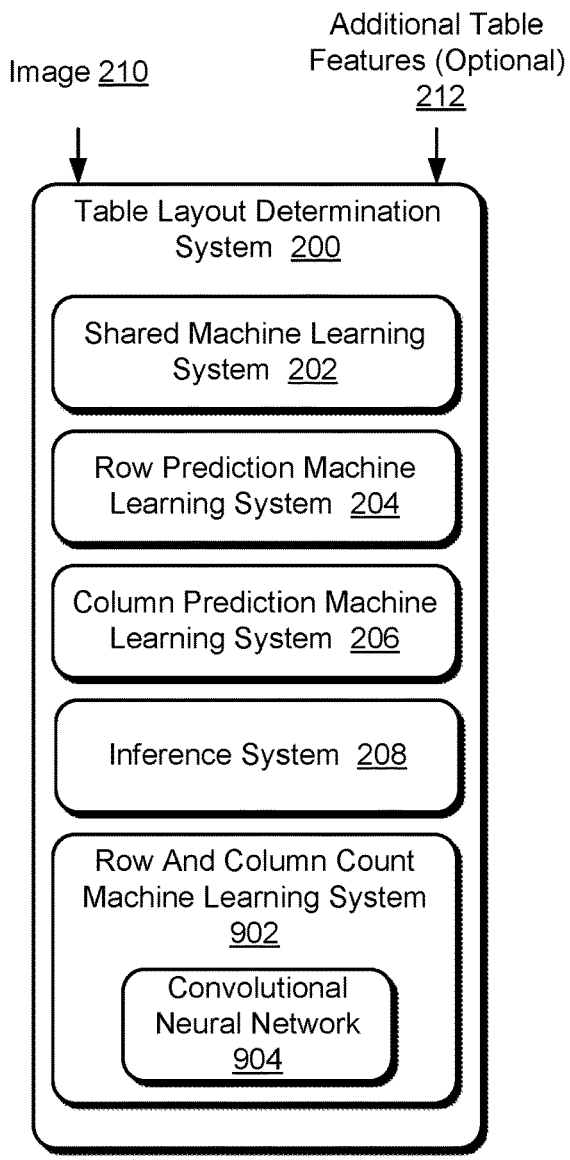
FIG. 9 illustrates another example implementation of the table layout determination system including a row and column count machine learning system.

The table layout determination system 200 discussed herein optionally generates a column and row count for the table. FIG. 9 illustrates another example implementation of the table layout determination system 200, including the shared machine learning system 202, the row prediction machine learning system 204, the column prediction machine learning system 206, the inference system 208, and a row and column count machine learning system 902. The row and column count machine learning system 902 implements functionality to predict the overall number of rows and columns in the table. The table layout determination system 200 obtains the image 210 of the table and optionally additional table features 212, and generates row and column separator identifiers as discussed above.

The row and column count machine learning system 902 employs a convolutional neural network 904. Although the row and column count machine learning system 902 is discussed herein as employing a convolutional neural network, it should be noted that the convolutional neural network 904 is an example, and that different types of machine learning systems can additionally or alternatively be used.

The convolutional neural network 904 receives the image 210 and optionally additional table features 212. The convolutional neural network 904 outputs values that are a prediction of a number (a count) of columns in the table in the image 210 and a prediction of a number (a count) of rows in the table in the image 210. The convolutional neural network 904 is trained on a set of training data that includes a set of images with tables and associated numbers of columns and rows in the table. This set of training data can be obtained in a variety of different manners, such as manually generated by a user, automatically generated by one or more computer programs, and so forth. The convolutional neural network 904 includes various filters with weights that are tuned (e.g., trained) to minimize the loss between the known (from the training data) numbers of columns and rows in the tables and the predicted number of columns and rows in the tables generated by the convolutional neural network 904. Any of a variety of loss functions or algorithms can be used to train the convolutional neural network 904.

The values generated by the row and column count machine learning system 902 are a prediction of a number (a count) of columns in the table in the image 210 and a prediction of a number (a count) of rows in the table in the image 210. These values can be used in a variety of different manners, and optionally maintained along with the column separator identifiers and row separator identifiers for the table. For example, the values generated by the row and column count machine learning system 902 can be used as a verification of the table layout identified by the table layout determination system 200. The number of columns and rows in the table layout identified by the table layout determination system 200 can be readily identified given the row separator identifiers and the column separator identifiers. If the number of columns and rows in the table layout identified by the table layout determination system 200 is the same as the number of columns and rows generated by the row and column count machine learning system 902, then the table layout identified by the table layout determination system 200 is used as the layout of the table in the image 210. However, if the number of columns and rows in the table layout identified by the table layout determination system 200 is not the same as the number of columns and rows generated by the row and column count machine learning system 902, then the table layout identified by the table layout determination system 200 is not used as the layout of the table in the image 210. Although this prevents the table layout identified by the table layout determination system 200 from being used to modify or alter the display of the table, it also prevents the table layout identified by the table layout determination system 200 from being used to poorly modify or alter the display of the table (and perhaps making the display of the table worse than simply displaying the image 210).

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-9.

Figure 10:
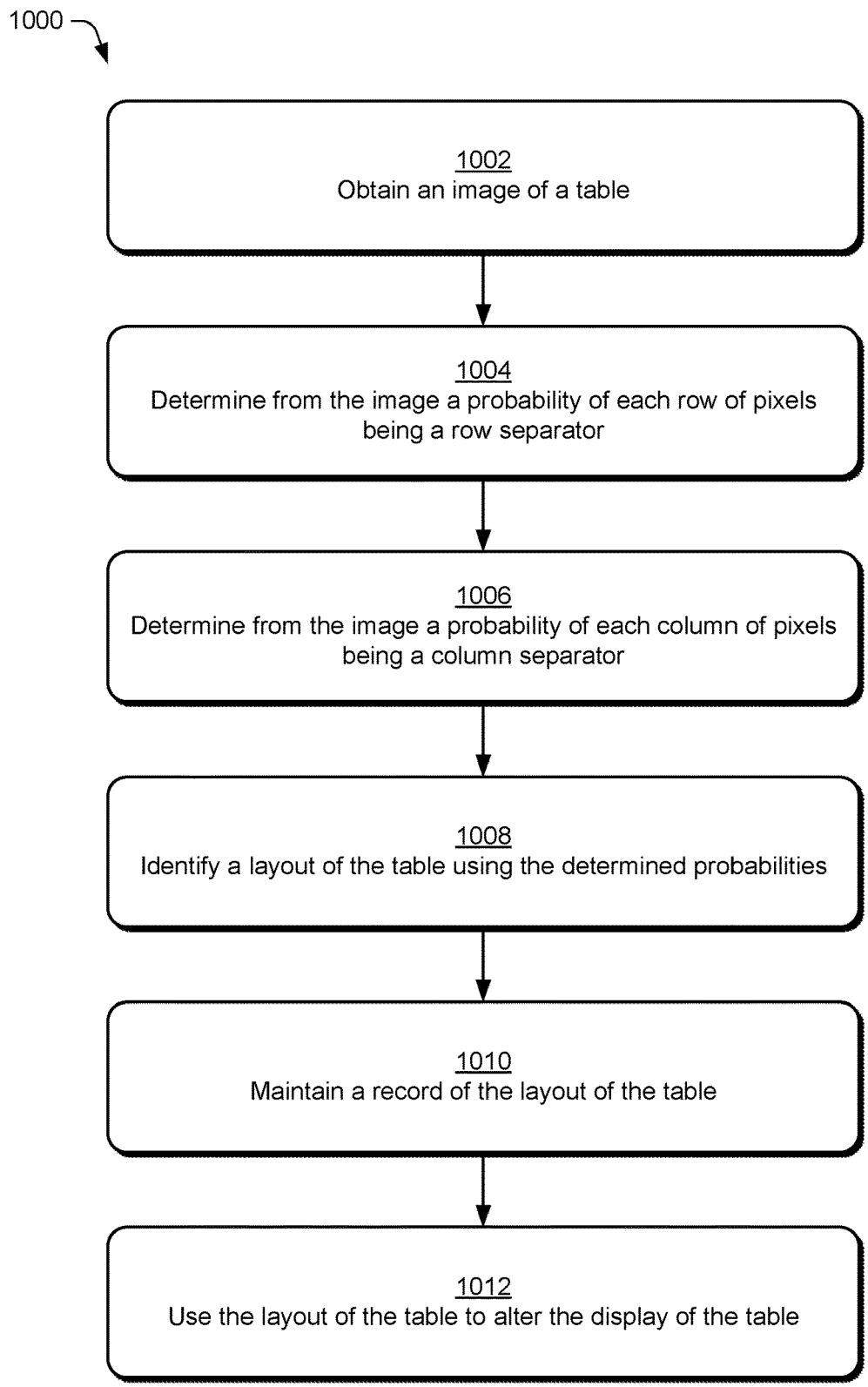
FIG. 10 is a flow diagram depicting a procedure in an example implementation of table layout determination using a machine learning system.

FIG. 10 is a flow diagram depicting a procedure in an example implementation of table layout determination using a machine learning system. In this example, an image of a table is obtained (block 1002). The image can be, for example, a grayscale or RGB rendering of the table. The image can be obtained in various manners, such as printed and captured from a PDF file, scanned using a camera or other image capture device, and so forth.

The probability of each row of pixels in the image being a row separator is determined (block 1004). These probabilities are generated by a row prediction machine learning system, such as row prediction machine learning system 204.

The probability of each column of pixels in the image being a column separator is also determined (block 1006). These probabilities are generated by a column prediction machine learning system, such as column prediction machine learning system 206.

A layout of the table is identified using the probabilities of each row being a row separator and each column being a column separator (block 1008). These probabilities used in block 1008 are the probabilities determined in blocks 1004 and 1006. The identified layout is, for example, a set of row separator identifiers and column separator identifiers, although other formats can be used (e.g., coordinates of cells in the table).

A record of the layout of the table is maintained (block 1010). This record can be stored in a local or remote storage device, communicated to another device or system, and so forth.

The layout of the table is used to alter the display of the table (block 1012). This alteration of the display can take various forms as discussed above, such as sorting the table, displaying the data in the table in a different format (e.g., a pie chart or bar chart), and so forth.

Example System and Device

Figure 11:
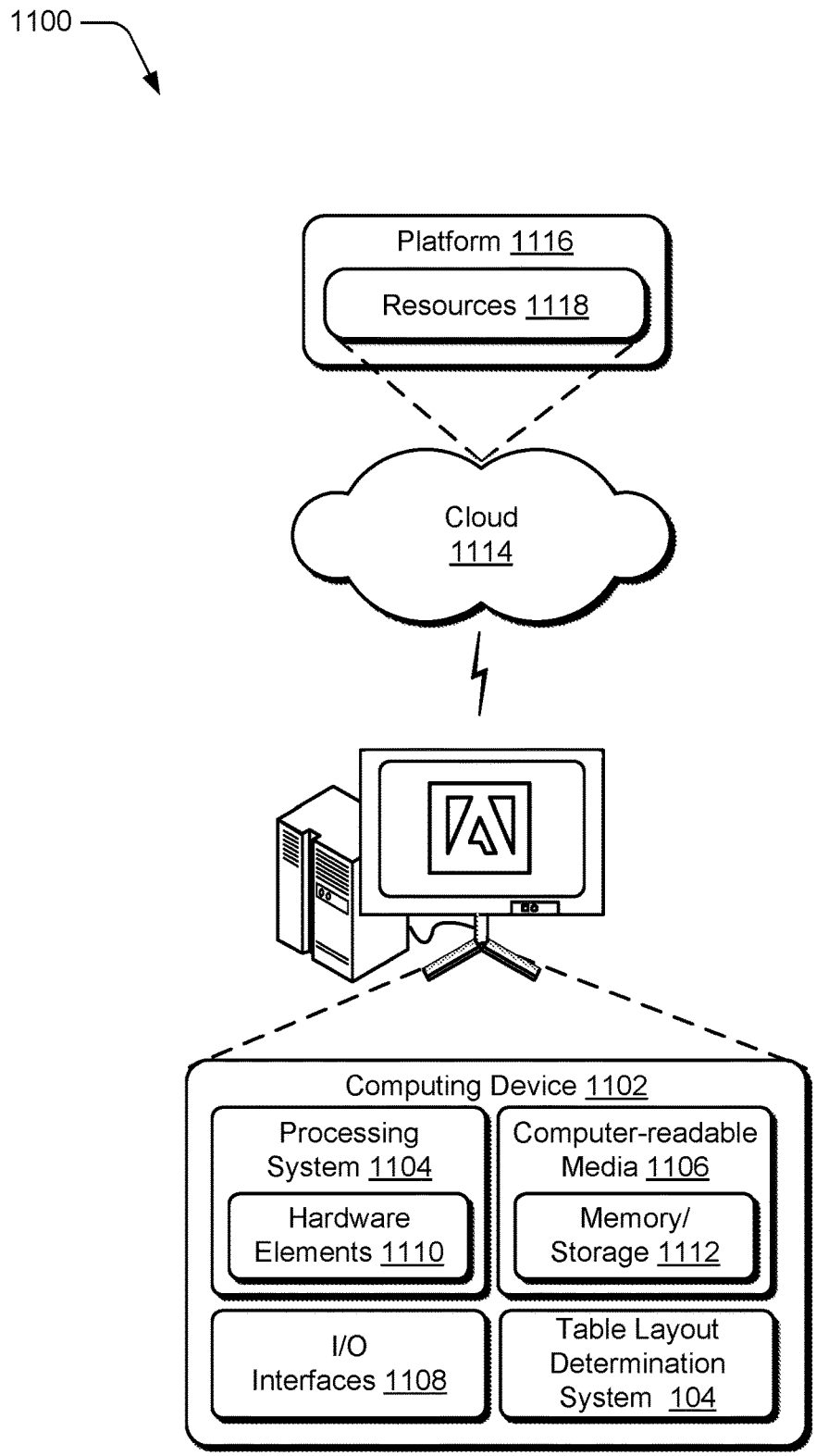
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the table layout determination system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to identify table layouts, a method implemented by a computing device, the method comprising:
   obtaining an image of a table having multiple cells;
   determining from the image, using a row prediction machine learning system, for each of multiple rows of pixels of the image a probability that the row of pixels is a row separator that separates one of the multiple cells from another cell vertically or that is a horizontal edge of the table;
   determining from the image, using a column prediction machine learning system, for each of multiple columns of pixels of the image a probability that the column of pixels is a column separator that separates one of the multiple cells from another cell horizontally or that is a vertical edge of the table;
   identifying a layout of the table by using the determined probabilities of rows of pixels being row separators to determine one or more row separators in the table, and using the determined probabilities of columns of pixels being column separators to determine one or more column separators in the table; and
   maintaining a record of the layout of the table.

2. The method as described in claim 1, the method further comprising using the layout of the table to alter the display of the table on the computing device.

3. The method as described in claim 1, the method implementing a global cut model, wherein:
   the determining, for each of the multiple columns of pixels of the image, a probability that the column of pixels is a column separator comprises pooling values for the column of pixels, resulting in a probability for the column of pixels that applies to all pixels in the column;
   the determining, for each of the multiple rows of pixels of the image, a probability that the row of pixels is a row separator comprises pooling values for the row of pixels, resulting in a probability for the row of pixels that applies to all pixels in the row; and
   the identifying includes selecting at least one row separator or column separator that cuts through text, images, or other cell content in the table.

4. The method as described in claim 3, the method further comprising:
   determining, based on whether a row separator or column separator cuts through text, images, or other cell content in a cell, when to combine two cells of the table together into a single cell; and
   merging, in response to determining to combine two cells of the table together into a single cell, the two cells together by modifying at least one row separator or column separator so that the row separators and column separators do not cut through text in the single cell.

5. The method as described in claim 1, the method implementing a recursive XY-cut model, wherein the determining, for each of the multiple columns of pixels of the image, a probability that the column of pixels is a column separator, the determining, for each of the multiple rows of pixels of the image, a probability that the row of pixels is a row separator, and the identifying the layout of the table is performed recursively on multiple sub-regions of the table, each subsequent iteration after an initial iteration of the determining, for each of the multiple columns of pixels of the image, a probability that the column of pixels is a column separator, the determining, for each of the multiple rows of pixels of the image, a probability that the row of pixels is a row separator, and the identifying the layout of the table being performed on a cell of the table identified in a previous iteration.

6. The method as described in claim 5, wherein the sub-region in the initial iteration comprises the entire table.

7. The method as described in claim 5, wherein in the initial iteration, the determining, for each of the multiple columns of pixels of the image, a probability that the column of pixels is a column separator, the determining, for each of the multiple rows of pixels of the image, a probability that the row of pixels is a row separator, and the identifying the layout of the table are performed for each of multiple sub-regions specified by path elements in a document storing the table.

8. The method as described in claim 1, the method further comprising:
obtaining one or more additional table features regarding the table and using the one or more additional table features for determining the probabilities of rows of pixels being row separator, for determining the probabilities of pixels being column separator, and for identifying the layout of the table.

9. The method as described in claim 8, the one or more additional table features comprising at least one table feature selected from the group including: grayscale renderings of only text elements of the table, grayscale renderings of only path elements of the table, and grayscale renderings of only image elements of the table.

10. The method as described in claim 8, the one or more additional table features comprising a binary rendering of bounding boxes of the table.

11. The method as described in claim 1, further comprising:
determining from the image, using a header prediction machine learning system, for each of multiple cells in the table, a probability that the cell is a header; and
the identifying the layout of the table including using the determined probabilities of cells being headers to determine one or more column headers or row headers in the table.

12. The method as described in claim 1, further comprising:
determining from the image, using a confidence machine learning system, a prediction of a confidence in the accuracy of the layout of the table; and
maintaining a record of the prediction of the confidence in the accuracy of the layout of the table.

13. The method as described in claim 1, further comprising:
determining from the image, using a row and column count machine learning system, a prediction of a number of columns in the table and a prediction of a number of rows in the table; and
maintaining a record of the prediction of the number of columns in the table and the prediction of the number of rows in the table.

14. In a digital medium environment to identify table layouts, a computing device comprising:
a processor; and
computer-readable storage media having stored thereon multiple instructions that, responsive to execution by the processor, cause the processor to perform operations comprising:
obtaining an image of a table having multiple cells;
determining from the image, using a row prediction machine learning system, for each of multiple rows of pixels of the image a probability that the row of pixels is a row separator that separates one of the multiple cells from another cell vertically or that is a horizontal edge of the table;
determining from the image, using a column prediction machine learning system, for each of multiple columns of pixels of the image a probability that the column of pixels is a column separator that separates one of the multiple cells from another cell horizontally or that is a vertical edge of the table;
identifying a layout of the table by using the determined probabilities of rows of pixels being row separators to determine one or more row separators in the table, and using the determined probabilities of columns of pixels being column separators to determine one or more column separators in the table; and
maintaining a record of the layout of the table.

15. The computing device as described in claim 14, the operations further comprising using the layout of the table to alter the display of the table on the computing device.

16. The computing device as described in claim 14, the multiple instructions implementing a global cut model, wherein:
the determining, for each of the multiple columns of pixels of the image, a probability that the column of pixels is a column separator comprises pooling values for the column of pixels, resulting in a probability for the column of pixels that applies to all pixels in the column;
the determining, for each of the multiple rows of pixels of the image, a probability that the row of pixels is a row separator comprises pooling values for the row of pixels, resulting in a probability for the row of pixels that applies to all pixels in the row; and
the identifying includes selecting at least one row separator or column separator that cuts through text, images, or other cell content in the table.

17. The computing device as described in claim 14, the multiple instructions implementing a recursive XY-cut model, wherein the determining, for each of the multiple columns of pixels of the image, a probability that the column of pixels is a column separator, the determining, for each of the multiple rows of pixels of the image, a probability that the row of pixels is a row separator, and the identifying the layout of the table is performed recursively on multiple sub-regions of the table, each subsequent iteration after an initial iteration of the determining, for each of the multiple columns of pixels of the image, a probability that the column of pixels is a column separator, the determining, for each of the multiple rows of pixels of the image, a probability that the row of pixels is a row separator, and the identifying the layout of the table being performed on a cell of the table identified in a previous iteration.

* * * * *